(12) United States Patent
Starkey

(10) Patent No.: US 8,224,860 B2
(45) Date of Patent: Jul. 17, 2012

(54) DATABASE MANAGEMENT SYSTEM

(75) Inventor: James A Starkey, Manchester, MA (US)

(73) Assignee: NUODB, Inc., Cambridge, MA (US)

( * ) Notice: Subject to any disclaimer, the term of this patent is extended or adjusted under 35 U.S.C. 154(b) by 0 days.

(21) Appl. No.: 13/051,750

(22) Filed: Mar. 18, 2011

(65) Prior Publication Data

US 2011/0231447 A1 Sep. 22, 2011

Related U.S. Application Data

(60) Provisional application No. 61/315,351, filed on Mar. 18, 2010.

(51) Int. Cl.
*G06F 17/30* (2006.01)
(52) U.S. Cl. ........................ 707/792; 707/805
(58) Field of Classification Search ................ 707/792, 707/805
See application file for complete search history.

(56) References Cited

U.S. PATENT DOCUMENTS

| 6,401,096 | B1 * | 6/2002 | Zellweger | 707/702 |
| 6,480,857 | B1 * | 11/2002 | Chandler | 707/792 |
| 6,499,036 | B1 * | 12/2002 | Gurevich | 707/778 |
| 6,748,394 | B2 * | 6/2004 | Shah et al. | 707/718 |
| 6,862,589 | B2 * | 3/2005 | Grant | 707/779 |
| 7,028,043 | B2 * | 4/2006 | Bleizeffer et al. | 707/754 |
| 7,080,083 | B2 * | 7/2006 | Kim et al. | 715/236 |
| 7,219,102 | B2 * | 5/2007 | Zhou et al. | 707/792 |
| 7,293,039 | B1 * | 11/2007 | Deshmukh et al. | 707/805 |
| 7,395,352 | B1 | 7/2008 | Lam et al. | |
| 7,401,094 | B1 * | 7/2008 | Kesler | 707/805 |
| 7,403,948 | B2 * | 7/2008 | Ghoneimy et al. | 707/792 |
| 2005/0216502 | A1 | 9/2005 | Kaura et al. | |
| 2008/0320038 | A1 | 12/2008 | Liege | |

* cited by examiner

*Primary Examiner* — Kim Nguyen
(74) *Attorney, Agent, or Firm* — George A. Herbster

(57) ABSTRACT

A multi-user, elastic, on-demand, distributed relational database management system. The database is fragmented into distributed objects called atoms. Any change to a copy of an atom at one location is replicated to all other locations containing a copy of that atom. Transactional managers operate to satisfy the properties of atomicity, consistency, isolation and durability.

44 Claims, 23 Drawing Sheets

MASTER CATALOG ATOM 70

| | |
|---|---|
| 70A | MASTER CATALOG ID=1 |
| 70B | POINTER TO MASTER CATALOG |
| 70C | POINTER TO CREATING CATALOG |
| 70D | POINTER TO CHAIRMAN |
| 70E | CHANGE NUMBER |
| 70F | LIST OF RELAYS |
| 70G | CYCLE REFERENCE |
| 70H | ACTIVE NODE LIST |
| 70I | STATUS STATES |
| 70J | GLOBAL NODE IDS |
| 70K | LOCAL NODE IDS |
| 70L | CONNECTION MANAGER |
| 70M | PENDING NODE |
| 70N | DATABASE UUI |
| 70P | CATALOG OF DATABASE, SCHEMA, TABLE AND TABLE CATALOG ATOMS |
| 70Q | PASSWORD |
| 70R | ACTUAL VERSION |
| 70S | SOFTWARE VERSION |
| 70T | POINTER TO TRANSACTION MANAGER ATOM |
| 70U | POINTER TO CONFIGURATION OBJECT |
| 70V | POINTER TO GARBAGE COLLECTION THREAD |
| 70W | POINTER TO PING THREAD |

FIG. 5

TRANSACTION MANAGER ATOM 71

| | |
|---|---|
| 71A | TRANSACTION ATOM ID |
| 71B | POINTER TO MASTER CATALOG |
| 71C | POINTER TO CREATING CATALOG |
| 71D | POINTER TO CHAIRMAN |
| 71E | CHANGE NUMBER |
| 71F | LIST OF RELAYS |
| 71G | CYCLE REFERENCE |
| 71H | ACTIVE NODE LIST |
| 71I | STATUS STATES |
| 71J | ID MANAGER |
| 71K | ACTIVE TRANSACTIONS LIST |
| 71L | COMMITTED TRANSACTIONS LIST |
| 71M | FAILED TRANSACTIONS LIST |
| 71N | COMMIT SEQUENCE INFORMATION |
| 71P | TRANSACTION-TRANSITION EVENT COUNTER |

FIG. 6

| DATABASE ATOM 72 |
|---|
| DATABASE ATOM ID |
| POINTER TO MASTER CATALOG |
| POINTER TO CREATING CATALOG |
| POINTER TO CHAIRMAN |
| CHANGE NUMBER |
| LIST OF RELAYS |
| CYCLE REFERENCE |
| ACTIVE NODE LIST |
| STATUS STATES |
| SCHEMA NAME-SCHEMA ID REGISTRY |

(rows labeled 72A–72J)

FIG. 7

SCHEMA ATOM 73

| | |
|---|---|
| 73A | SCHEMA ATOM ID |
| 73B | POINTER TO MASTER CATALOG |
| 73C | POINTER TO CREATING CATALOG |
| 73D | POINTER TO CHAIRMAN |
| 73E | CHANGE NUMBER |
| 73F | LIST OF RELAYS |
| 73G | CYCLE REFERENCE |
| 73H | ACTIVE NODE LIST |
| 73I | STATUS STATES |
| 73J | TABLE NAME-TABLE ATOM ID REGISTRY |
| 73K | SEQUENCE NAME-SEQUENCE ID MANAGER REGISTRY |

FIG. 8

TABLE ATOM 74

| | |
|---|---|
| 74A | TABLE ATOM ID |
| 74B | POINTER TO MASTER CATALOG |
| 74C | POINTER TO CREATING CATALOG |
| 74D | POINTER TO CHAIRMAN |
| 74E | CHANGE NUMBER |
| 74F | LIST OF RELAYS |
| 74G | CYCLE REFERENCE |
| 74H | ACTIVE NODE LIST |
| 74I | STATUS STATES |
| 74J | POINTER TO CORRESPONDING TABLE CATALOG ATOM |
| 74K | LIST OF FIELDS |
| 74L | ID MANAGER FOR FIELD IDS |
| 74M | ID MANAGER FOR INDEX ATOM IDS |
| 74N | ID MANAGER FOR DATA ATOM IDS |
| 74P | ID MANAGER FOR BLOB ATOM IDS |
| 74Q | ID MANAGER FOR TYPES |
| 74R | SUBTYPE LISTS |
| 74S | ARRAY OF RECORD STATES ATOM IDS |
| 74T | ARRAY OF BLOB STATES ATOM IDS |

FIG. 9

TABLE CATALOG ATOM 75

| Ref | Field |
|---|---|
| 75A | TABLE ATOM ID |
| 75B | POINTER TO MASTER CATALOG |
| 75C | POINTER TO CREATING CATALOG |
| 75D | POINTER TO CHAIRMAN |
| 75E | CHANGE NUMBER |
| 75F | LIST OF RELAYS |
| 75G | CYCLE REFERENCE |
| 75H | ACTIVE NODE LIST |
| 75I | STATUS STATES |
| 75J | ID MANAGER FOR ATOM IDS |
| 75K | LIST OF ALL ATOMS ASSOCIATED WITH THE CORRESPONDING TABLE ATOM |
| 75L | POINTERS TO EACH ATOM ASSOCIATED WITH THE CORRESPONDING TABLE ATOM |
| 75M | FOR EACH LISTED ATOM, THE IDENTIFY OF EACH NODE WITH A COPY OF THAT ATOM IN MEMORY |
| 75N | BITMAPS TO OBJECTS AND DIRECTORIES |

FIG. 10

| INDEX ATOM 76 | |
|---|---|
| 76A | INDEX ATOM ID |
| 76B | POINTER TO MASTER CATALOG |
| 76C | POINTER TO CREATING CATALOG |
| 76D | POINTER TO CHAIRMAN |
| 76E | CHANGE NUMBER |
| 76F | LIST OF RELAYS |
| 76G | CYCLE REFERENCE |
| 76H | ACTIVE NODE LIST |
| 76I | STATUS STATES |
| 76J | BINARY TREE OF INDEX NODES |
| 76K | INDEX LEVEL |

FIG. 11

RECORD STATES ATOM 77

| Ref | Field |
|---|---|
| 77A | RECORD STATES ATOM ID |
| 77B | POINTER TO MASTER CATALOG |
| 77C | POINTER TO CREATING CATALOG |
| 77D | POINTER TO CHAIRMAN |
| 77E | CHANGE NUMBER |
| 77F | LIST OF RELAYS |
| 77G | CYCLE REFERENCE |
| 77H | ACTIVE NODE LIST |
| 77I | STATUS STATES |
| 77J | ARRAY OF MANAGED DATA ATOMS |
| 77K | RECORD ID FOR BASE RECORD |
| 77L | POINTER TO TABLE ATOM |
| 77M | BITMAP OF VERSIONED RECORDS |
| 77N | FOR EACH RECORD VERSION |
| 77P | TRANSACTION ID |
| 77Q | FORMAT VERSION |
| 77R | RECORD VERSION SEQUENCE NUMBER |
| 77S | LOCATION OF NEXT OLDER VERSION |
| 77T | INDEX TO DATA ATOM ARRAY |
| 77U | SLOT IN DATA ATOM FOR ACTUAL DATA |

FIG. 12

DATA ATOM 78

| | |
|---|---|
| 78A | DATA ATOM ID |
| 78B | POINTER TO MASTER CATALOG |
| 78C | POINTER TO CREATING CATALOG |
| 78D | POINTER TO CHAIRMAN |
| 78E | CHANGE NUMBER |
| 78F | LIST OF RELAYS |
| 78G | CYCLE REFERENCE |
| 78H | ACTIVE NODE LIST |
| 78I | STATUS STATES |
| 78J | ID MANAGER FOR RECORD SLOTS |
| 78K | ADDRESS AND LENGTH OF EACH RECORD WITHIN THE DATA ATOM |
| 78L | DATA RECORDS |

FIG. 13

BLOB STATES ATOM 80

| | |
|---|---|
| 80A | BLOB STATES ATOM ID |
| 80B | POINTER TO MASTER CATALOG |
| 80C | POINTER TO CREATING CATALOG |
| 80D | POINTER TO CHAIRMAN |
| 80E | CHANGE NUMBER |
| 80F | LIST OF RELAYS |
| 80G | CYCLE REFERENCE |
| 80H | ACTIVE NODE LIST |
| 80I | STATUS STATES |
| 80J | LIST OF ASSOCIATED BLOB ATOMS |
| 80K | BLOB ID FOR BASE BLOB |
| 80L | POINTER TO TABLE ATOM |
| 80M | FOR EACH BLOB |
| 80N | INDEX TO BLOB ATOM |
| 80O | SLOT IN BLOB ATOM FOR ACTUAL BLOB |

FIG. 14

BLOB ATOM 81

| | |
|---|---|
| 81A | BLOB ATOM ID |
| 81B | POINTER TO MASTER CATALOG |
| 81C | POINTER TO CREATING CATALOG |
| 81D | POINTER TO CHAIRMAN |
| 81E | CHANGE NUMBER |
| 81F | LIST OF RELAYS |
| 81G | CYCLE REFERENCE |
| 81H | ACTIVE NODE LIST |
| 81I | STATUS STATES |
| 81J | ID MANAGER FOR BLOB SLOTS |
| 81K | ADDRESS AND LENGTH OF EACH BLOB |
| 81L | BLOB |

FIG. 15

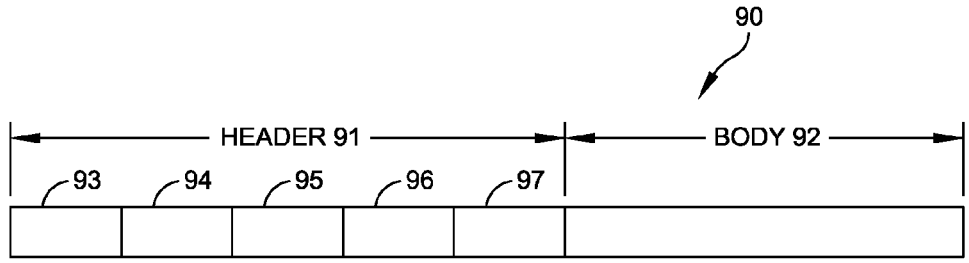

FIG. 16

MESSAGES

| | | | |
|---|---|---|---|
| 110 | PING | 135 | TABLE BLOBS OBJECT |
| 111 | PING ACKNOWLEDGE | 136 | TABLE BLOB |
| 112 | CONNECT | 137 | TABLE TYPE |
| 113 | WELCOME | 138 | TABLE RECORD EXPUNGE |
| 114 | NEW NODE | 139 | TABLE GARBAGE COLLECT |
| 115 | NODE STATE | 140 | RECORDS UPDATE REQUEST |
| 116 | OBJECT REQUEST | 141 | RECORDS UPDATE RESPONSE |
| 117 | OBJECT | 142 | RECORDS UPDATE |
| 118 | OBJECT AVAILABLE | 143 | RECORDS DATA OBJECT |
| 119 | OBJECT ACKNOWLEDGED | 144 | RECORDS RECORD |
| 120 | OBJECT COMPLETE | 145 | RECORDS PRUNE |
| 121 | OBJECT UNAVAILABLE | 146 | BACKOUT RECORD |
| 122 | BOUNCE OBJECT | 147 | INDEX SPLIT REQUEST |
| 123 | REGISTER OBJECT | 148 | INDEX SPLIT |
| 124 | UNREGISTER OBJECT | 149 | INDEX PRUNE |
| 125 | OBJECT DELETE | 150 | INDEX NODE ADDED |
| 126 | OBJECT WRITTEN | 151 | TABLE INDEX READY |
| 127 | ID REQUEST | 152 | BLOBS BLOB |
| 128 | ID DELEGATION | 153 | DATA RECORD |
| 129 | TABLE FIELD ADDED | 154 | TRANSACTION STATE |
| 130 | TABLE FORMAT | 155 | TRANSACTION BLOCKAGE |
| 131 | TABLE REQUEST RECORDS | 156 | TRANSACTION DEADLOCK |
| 132 | TABLE RECORDS OBJECT | 157 | REQUEST WRITE TIMES |
| 133 | TABLE RECORD | 158 | WRITE TIMES |
| 134 | TABLE INDEX ADDED | | |

FIG. 17

NODE OBJECT 400

| | |
|---|---|
| 400A | POINTER TO THE NODE OBJECT SOCKET |
| 400B | POINTER TO MASTER CATALOG ATOM |
| 400C | POINTER TO THE CONNECTION MANAGER |
| 400D | POINTER TO THE LISTENING THREAD |
| 400E | POINTER TO A SOCKET BUFFER |
| 400F | GLOBAL NODE ID |
| 400G | LOCAL NODE ID |
| 400H | POINTER TO QUEUED MESSAGES |
| 400I | LOCAL PORT ID |
| 400J | REMOTE PORT ID |
| 400K | SOFTWARE VERSION AT REMOTE NODE |
| 400L | NODE TYPE |
| 400M | NODE NAME |
| 400N | REMOTE NODE NAME |
| 400P | POINTER TO CURRENT MESSAGE |
| 400Q | LAST PING |
| 400R | TRIP TIME |
| 400S | COMMIT SEQUENCE NUMBER |
| 400T | THIS NODE |

FIG. 19

DATABASE MANAGEMENT SYSTEM

BACKGROUND OF THE INVENTION

1. Field of the Invention

This invention generally relates to database management systems. More specifically this invention relates a method and apparatus for implementing a multi-user, elastic, on-demand, distributed relational database management system characterized atomicity, performance and scalability.

2. Description of Related Art

Over the past years the use of databases for storing and retrieving messages has emerged as an important tool in a wide variety of commercial applications. Initially, many database systems operated on a single server installation with multiple users. However, various factors have developed over the past years that have required the basic nature of database architecture to change. As a first factor, database storage requirements have become extremely large. Second, the number of users trying to access such databases has also become large. Third, the use of databases to retrieve relatively stable data with minimal updates has been replaced by transactional processing.

A transaction is a unit of work must be completed in its entirety. A single transaction may include multiple data manipulations. As an example a single transaction may include a reading operation followed by a write operation. In recent years significant effort has been directed to enabling relational databases to support ever increasing rates of transaction processing.

Databases are now judged by a standard that defines ACID properties, namely: atomicity, consistency, isolation and durability. Atomicity guarantees that all transaction tasks will be completed in their entireties. Consistency assures is that only valid data is written to the database. Isolation assures that other operations cannot access or "see" data in an intermediate state during a transaction. Durability assures that once a transaction has been processed successfully, it cannot be undone.

Consistency is particularly important in multi-user systems where it is possible for two or more users to seek concurrent access to shared volatile data. Early multi-user systems used locking operations to assure consistency. Locks could be exclusive, or write, locks, or non-exclusive, or read, locks and could be applied to individual records or to pages. However, as databases have grown in size and as transaction rates have increased, the overhead for managing locks has become significant and, in some cases, prohibitive.

Multi-version concurrency control (MVCC) is an alternative process for assuring concurrency. MVCC can be more effective than locks with complex databases. MVCC uses timestamps or increasing transaction identifications (IDs) to serialize different versions of a record. Each version permits a transaction to read the most recent version of an object which precedes the timestamp or ID. With this control method, any change to a record, for example, will not be seen by other users until the change is committed. MVCC also eliminates locks with other attendant overhead and establishes a system in which read operations can not block write operations.

In addition to meeting the ACID tests, there now is a requirement for continuous availability to users. Some database systems dedicate one computer system to transaction processing and another to decision support and other reporting processes. They are interconnected so that other functions can be supported simultaneously. As databases grow in size and complexity, existing data processing systems are replaced by more powerful data processing system. Another approach for accommodating growth involves replicated systems where one machine is designated as a "head" machine that keeps all the replicated machines in synchronism. If a head machine were to fail, a process would assign that function to another replicated machine. Different replicated machines are available to certain users. This approach is not scalable because all the machines have to have the same capability.

As another approach, multiple autonomous database systems can be integrated into a single "federated" database with a computer network interconnecting the various individual databases. Federated databases require "middleware" to maintain the constituent databases in synchronism. This "middleware" can become very complex. As the database size increases, the resources required for operating the middleware may impose such a sufficiently great overhead that overall system performance degrades.

"Partitioning" is another approach for implementing databases in which a logical database or its constituent elements are divided into distinct independent parts. In a distributed database management system, each partition may be spread over multiple nodes. Users at given node can perform local transactions on the partition. Partitioning also can be implemented by forming smaller databases or by splitting selected elements of just one table.

There are two general approaches to partitioning. In horizontal partitioning, also called "sharding", different rows are placed in different tables and different servers. Generally they have a certain commonality such as a range of zip codes or last names which are divided into different tables by ranges. For example a first database might contain all the records for last names in the range A through M; a second database, in the range N through Z. Sharding, which is a form of horizontal partitioning, involves locating rows of a database on separate servers. Sharding does reduce the number of rows in each table and increases search performance. However, sharding uses a hash code at an application level that makes it much more difficult to implement. It also incorporates a two-phase commit. The complexities of sharding make it suitable for particular applications as the basis for defining the shards is quite well defined.

Vertical partitioning involves the creation of tables with fewer columns and splitting columns across tables. Like a federated database, vertical partitioning requires middleware to determine how to route any request for a particular field to an appropriate partition. In addition these systems operate using a two-phase commit sequence which is complicated to implement.

In still another approach, known as a "shared-nothing" architecture, each node is independent and self-sufficient. Shared-nothing architecture is popular for web development because it can be scaled upward simply by adding nodes in the form of inexpensive computers. This approach is popular in data warehousing applications where updates tend to be less frequent than would occur with transaction processing. However, the processing of joins is very complex over large data sets from different partitions or machines.

Some database systems are referred to as "distributed" systems. One implementation of a distributed system incorporates "clusters" and two communications paths. A high-speed Internet path carries data among the clusters. High-speed dedicated communications paths are required for various control functions, such as lock management. While this approach solves the redundancy and availability issues for databases, lock management, as previously discussed, can limit system performance.

In a "shared everything" system, super high-speed communications keep the system in synchronism. However lock management can require significant bandwidth resources. To avoid this, such systems incorporate point-to-point communications channels and a very sophisticated disk controller.

Collectively, those prior art systems satisfy some but not all of the known requirements for a database system. What is needed is a database architecture that is scalable, that meets the ACID properties of atomicity, consistency, isolation and durability. What is also needed is a database system that operates over the Internet without the need for dedicated high-speed communications paths, that provides transaction processing and that is operable over a wide geographic area.

SUMMARY

Therefore, it is an object of this invention to provide an elastic, scalable, on-demand, distributed data processing system.

Another object of this invention is to provide an elastic, scalable, on-demand, distributed data processing system that is fault tolerant.

Still another object of this invention is to provide an elastic, scalable, on-demand, distributed data processing system that has a high degree of availability.

Yet another object of this invention is to provide an elastic, scalable, on-demand, distributed data processing system that is platform independent.

Still yet other object of this invention is to provide an elastic, scalable, on-demand, distributed data processing system that is atomic, consistent, isolated and durable.

Yet still another object of this invention to provide an elastic, scalable, on-demand, distributed data processing system that operates over the Internet without a need for dedicated high-speed communications paths.

Still yet another object of this invention is to provide an elastic, scalable, on-demand, distributed data processing system that provides transaction processing and that is adapted for implementation over a wide geographic area.

In accordance with one aspect of this invention a database management system that enables users to interact with a database comprised of data and metadata comprises a plurality of nodes and persistent storage with communications paths therebetween. Each node includes an interface between high level-input and output commands at a user level and input and output commands at the system level that control a sequence of operations for interacting with the database, wherein, in response to certain system level commands, atom objects generate atoms, each atom containing a specified fragment of data or metadata whereby a set of all instances of atoms collectively define all the metadata and data in the database. Each node additionally includes a communications control for establishing a communications path with each other node in the system, a method responsive to a system command from the interface for requesting from a selected node copy of an atom that is relevant to the query but is not present in that node, a method responsive to a request for an atom from another node for replicating the requested atom for transfer to the requesting node whereby only atoms required to complete a query need be located in any transaction node at any given time, and a method responsive to a change in an atom at that node for replicating that atom for transfer to every other node in the system in which that atom is resident. The persistent storage contains a collection of atoms that collectively contain all the data and metadata in the database.

In accordance with another aspect of this invention database management system that enables users to interact with a database comprised of data and metadata, said system includes at least one transactional node that provide users with access to the database and at least one archival node that maintains an archive of the entire database. Each transactional node includes a database request engine that provides an interface between high level-input and output query commands at a user level and input and output commands at the system level that control a sequence of operations for interacting with the database. In response to certain system level commands, atom objects generate atoms. Each atom contains a specified fragment of data or metadata whereby a set of all instances of atoms collectively define all the metadata and data in the database. A database system network interconnects all the nodes. A communications control in each of the nodes for establishes a communications path with each other node in the system, A method in each transactional node responds to a system command from the database request engine for requesting a copy of an atom that is relevant to the query command but is not present in that node. Another method in each node responds to a request for an atom from another node for replicating the requested atom for transfer to the requesting node whereby only atoms required to complete a query command need be located in any transactional node at any given time. Another method in each transactional node responds to a change in an atom at that node for replicating that change to every other node in the system that contains a copy of that atom In accordance with yet another aspect of this invention a database management system for a logical database comprised of data records organized into tables that is to be accessed from multiple transactional nodes that process transactions related to the logical data base wherein the database is parsed into fragments wherein each fragment stores a portion of the metadata and/or data pertaining to the logical data base for transfer within the database management system as serialized messages and for storage as a de-serialized message. The system includes at least one archival node that stores all the fragments in a de-serialized form in permanent storage thereby to constitute a single store for the entire data base. Each transactional node responds to queries from users by establishing a sequence of low-level commands for identifying fragments that are relevant to the query and responds to the low-level commands by obtaining only those copies of existing fragments that are relevant to the query being processed thereat whereby a given fragment might exist at some other node or only at an archival node. Each transactional node replicates any changed fragment to the at least one archival node and each transactional node in which a copy of that fragment resides whereby changes are made to fragments in other nodes on a peer-to-peer basis and whereby any transactional node only contains those fragments that pertain to the queries being made users accessing the data base through that transactional node.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 5 depicts the information in a Master Catalog atom;

FIG. 6 depicts the information in a Transaction Manager atom;

FIG. 7 depicts the information in a Database atom;

FIG. 8 depicts the information in a Schema atom;

FIG. 9 depicts the information in a Table atom;

FIG. 10 depicts the information in a Table Catalog atom;

FIG. 11 depicts the information in an Index atom;

FIG. 12 depicts the information in a Record States atom;

FIG. 13 depicts the information in a Data atom;

FIG. 14 depicts the information in a Blob States atom;

FIG. 15 depicts the information in a Blob atom;

FIG. 16 depicts the syntax of a exemplary asynchronous message that is transferred among the transactional and archival nodes of the database system of FIG. 1;

FIG. 17 depicts various messages types by which information is transferred among the transactional and archival nodes of the database system of FIG. 1;

FIG. 19 depicts the information in a node object;

DESCRIPTION OF AN ILLUSTRATIVE EMBODIMENT

Figure 1:
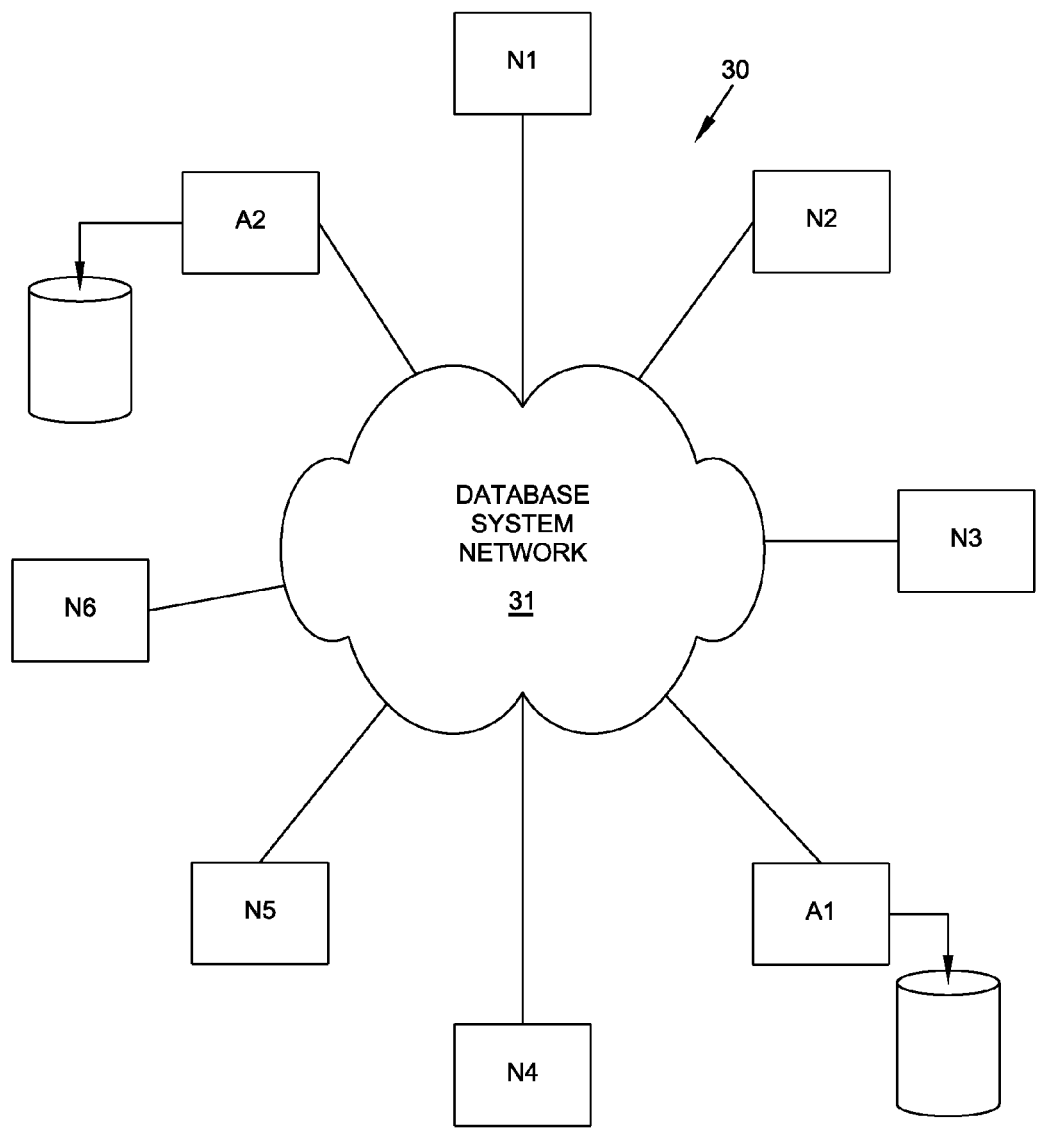
FIG. 1 is a diagram in schematic form of one embodiment of an elastic, scalable, on-demand, distributed data processing system that incorporates this invention with interconnected transactional and archival nodes.

FIG. 1 depicts one embodiment of an elastic, scalable, on-demand, distributed database system 30 with a plurality of data processing nodes that incorporates this invention. Nodes N1 through N6 are "transactional nodes" that provide user applications access to the database; nodes A1 and A2, "archival nodes" that function to maintain a disk archive of the entire database at each archival node. While an archival node normally stores the entire database, a single transactional node contains only that portion of the database it determines to be necessary to support transactions being performed at that node at that time.

Each node in FIG. 1 can communicate directly with each other node in the system 30 through a database system network 31. For example, node N1 can establish a communications path with each of nodes N2 through N6, A1 and A2. Communications between any two nodes is by way of serialized messages. In a preferred embodiment, the messaging is performed in an asynchronous manner to maximize the bandwidth used by the system thereby to perform various operations in a timely and prompt manner. Typically the database system network 31 will operate with a combination of high-bandwidth, low-latency paths (e.g., an Ethernet network) and high-bandwidth, high-latency paths (e.g., a WAN network). Each node has the capability to restrict use of a low-latency path to time-critical communications (e.g., fetching an atom).

The high-latency path can be used for non-critical communications (e.g. a request to update information for a table). Also and preferably, the data processing network of this invention incorporates a messaging protocol, such as the Transmission Control Protocol (TCP), and assures that each node processes messages in the same sequence in which they were sent to it by other nodes.

Figure 2:
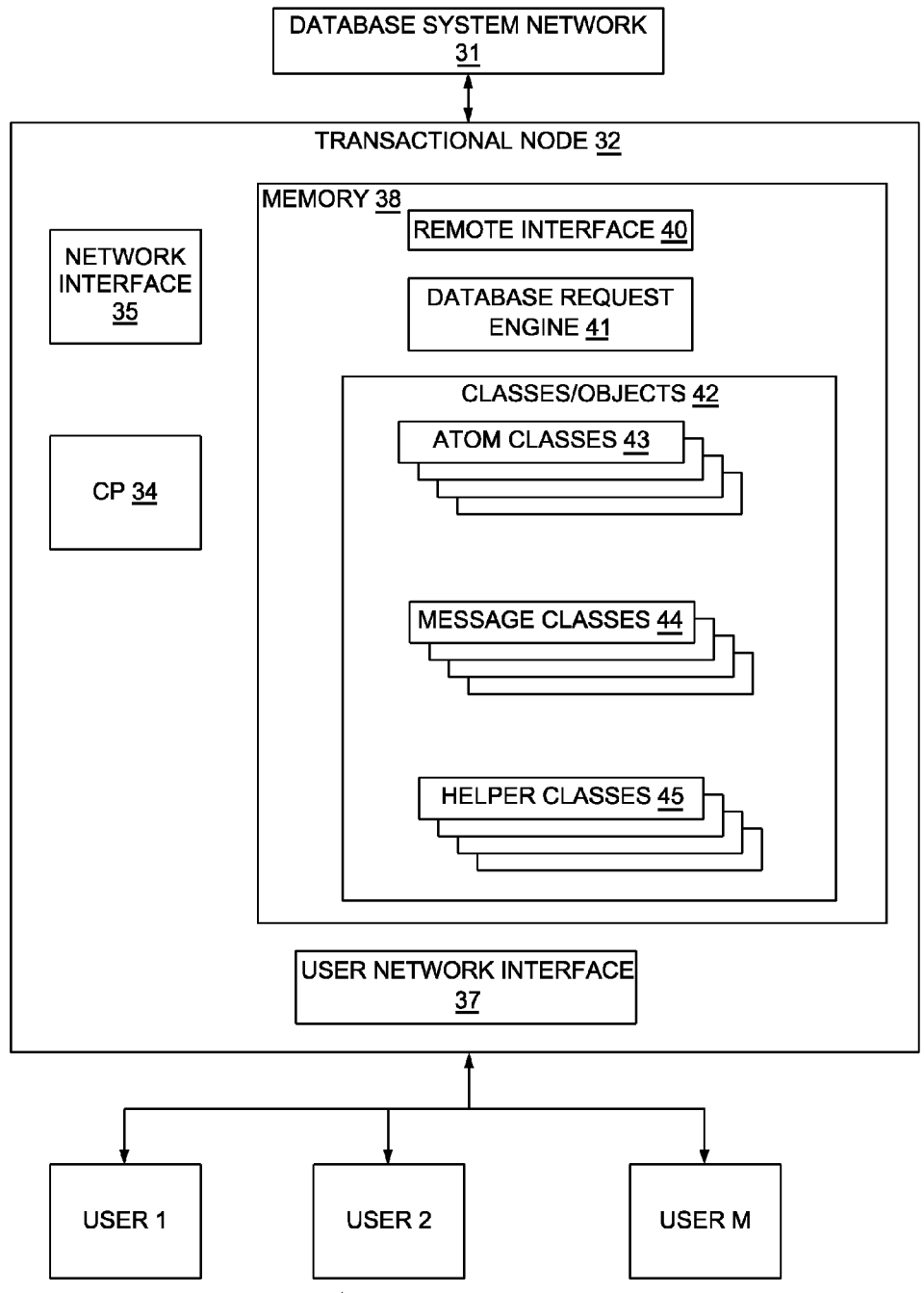
FIG. 2 depicts the organization of a transactional node.

FIG. 2 depicts a representative transactional node 32 that links to the database system network 31 and various end users 33. The transactional node 32 includes a central processing system (CP) 34 that communicates with the database system network 31 through a network interface 35 and with the various users through and user network interface 37. The central processing system 34 also interacts with RAM memory 38 that contains a copy of the database management program that implements a preferred embodiment of this invention. This program functions to provide a remote interface 40, a database request engine 41 and a set 42 of classes or objects.

The database request engine 41 only exists on transactional nodes and is the interface between the high-level input and output commands at the user level and system level input and output commands at the system level. In general terms, its database request engine parses, compiles and optimizes user queries such as SQL queries into commands that are interpreted by the various classes or objects in the set 42.

For purposes of the explanation of this invention, the set classes/objects set 42 is divided into a subset 43 of "atom classes," a subset 44 of "message classes" and a subset 45 of "helper classes." Additional details of these classes are described later.

As will become apparent and in accordance with this invention, at any given time a transactional node only contains those portions of the total database that are then relevant to active user applications. Moreover, the various features of this invention enable all portions of database in use to be resident in random access memory 38. There is no need for providing supplementary storage, such as disk storage, at a transactional node during the operation of this system.

Figure 3:
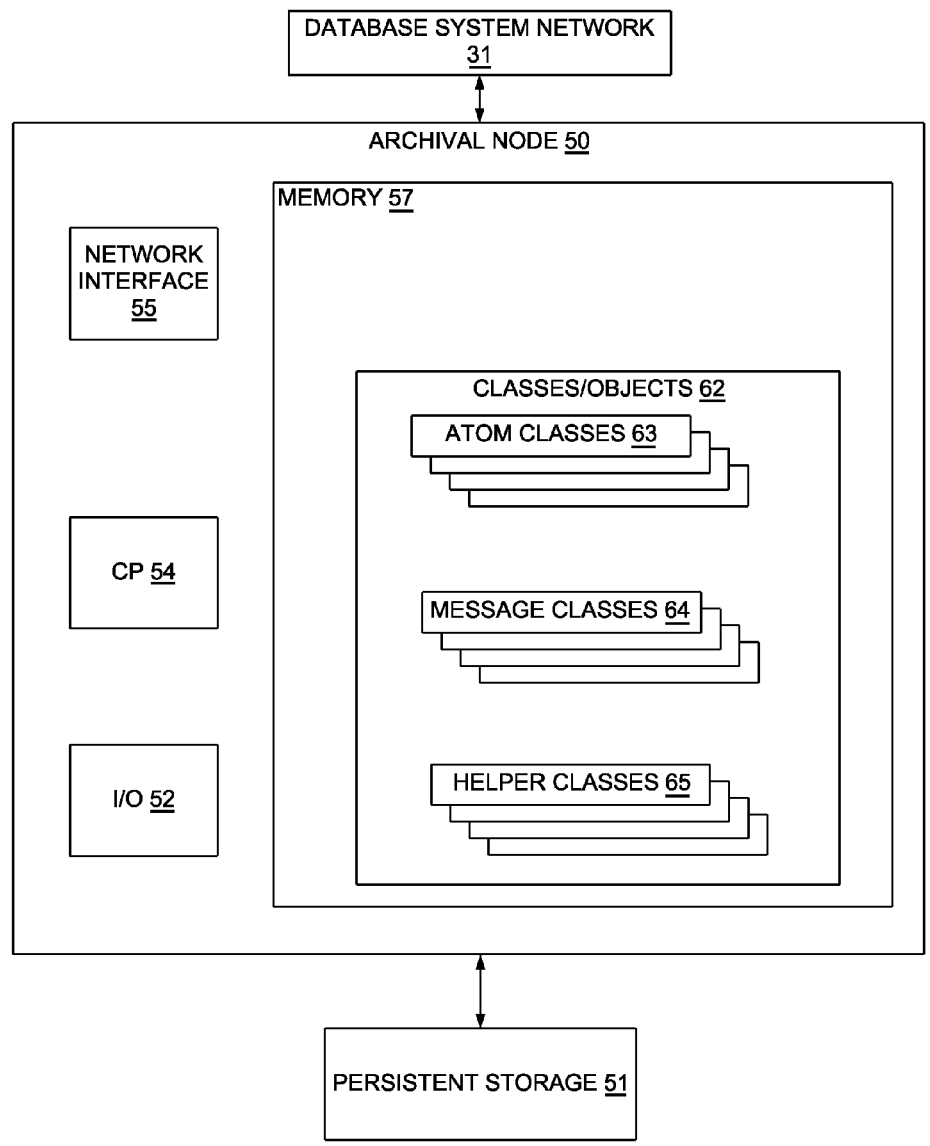
FIG. 3 depicts the organization of an archival node.

Referring to FIG. 3, each archival node 50, such as archival node A1 or A2 in FIG. 1, also connects to the database system network 31. However, in place of end users 33 associated with a transactional node 32 in FIG. 2, an archival node connects only to persistent storage 51, typically a disk-based storage system or a key value store. The archival node 50 includes a central processing system 54 that communicates with the persistent storage 51 through an I/O channel 52 and with the database system network 31 through a network interface 55. The central processing system 54 also interacts with RAM memory 57 that contains a set 62 of classes or objects. Similarly to the transactional node 32 in FIG. 2, the classes/objects set 62 in FIG. 3 includes a set 63 of "atom classes," a set 64 of "message classes" and a set 65 of "helper classes."

A preferred embodiment of this invention uses object-oriented programming (OOP) wherein, as known in the art, classes and subclasses such as shown in FIGS. 2 and 3 define methods, data structures and processes by which an "instance", or object, of that class or subclass may be generated. An "instance" may be generated using "inheritance" and/or "polymorphism." It will become apparent to those skilled in the art that implementations are possible that do not use object-oriented programming or variations on the specifically disclosed embodiment.

This invention will now be described in several phases. An "Atoms" section defines the hierarchy and function of objects produced by the atom classes 43 and 63 in FIGS. 2 and 3 respectively. A "Messages" section describes a set of messages which provide communications among the transactional and archival nodes as might be produced by message classes 44 and 64 in FIGS. 2 and 3 respectively. A "Methods" section describes basic operations with respect to database management. An "Example" section describes the interaction of the atom, message and methods by which the objectives of this invention are achieved in response to a specific database query to the database request engine 41.

Atoms

As previously stated, each of the atom classes 43 in FIG. 2 and 63 in FIG. 3 produce "atoms". More specifically, the atom classes define one or more "atom types" or "atom objects." Each "atom type" or "atom object" produces an "instance" of itself, that is, an "atom." As will become apparent with a more detailed understanding of the purpose of each specific atom object, each "atom" contains a specific fragment of database information. Some atoms contain a portion of the database metadata; others contain data records; still others serve as catalogs that create and track other atom types. Some "atom types" may only instantiate one atom which replicates to all nodes. Other "atom types" may instantiate multiple atoms which are replicated to other nodes on an as-needed basis.

Atoms have certain characteristics. In a transactional node, an atom exists only in non-persistent memory and in the form of a de-serialized message that has populated a particular atom type to provide an efficient memory resident format for the atom. Each atom has means for encoding its content into a serialized message and means for decoding a serialized message to retrieve the contents of the atom. Such serialized messages are used in connection with a number of operations as will be described later.

Each serialized message transmitted from a node for replicating an atom includes the content of that atom with an appended node identification and the most recent transaction commit sequence number for that node. When an archival node receives that serialized message, it de-serializes the message, removes the node list and commit sequence number before placing the remaining content of the message (i.e., an atom) in persistent storage.

A number of rules apply to atoms in accordance with this invention. The reasons and implications of those rules will become more apparent. First, each atom must have a unique identification to provide a reliable identification of that atom anywhere in the database processing network 30 in FIG. 1. Second, any atom must exist in two nodes simultaneously to maintain redundancy, except that a single atom can exist after it is created and before an archive node has requested a copy. Third, a transactional node will load an atom only on demand. Fourth, each time a change is made to an atom in one node, that node must replicate that changed atom on a "peer-to-peer" basis; i.e., to all archival nodes and only those transactional nodes that contain that same atom.

A "garbage collection" process, described in greater detail later, can occur on archival and transactional nodes. The process removes inactive atoms from transactional and archival nodes. As a result, a transactional node can store those atoms that are then currently relevant to user applications in random access memory at that node. Thus, the database request engine 41 "sees" the entire database as being local and is not aware that it is operating in a multi-node environment and without a complete copy of the database at its node. Archival nodes have the option of purging the contents of an atom after it has been serialized to disk thereby reducing the size of the memory required for storage. If an archival node receives a replication message for such an atom, the archival node must fetch the content from disk storage before applying the information from the atom being replicated.

With this general background, each atom type will now be described at a "logical" or functional level. This information, in conjunction with further discussions of the operation of this invention, will enable a person of ordinary skill in the art to make and use this invention in any of a variety of implementations, including implementations based upon object oriented programming.

Figure 4A:
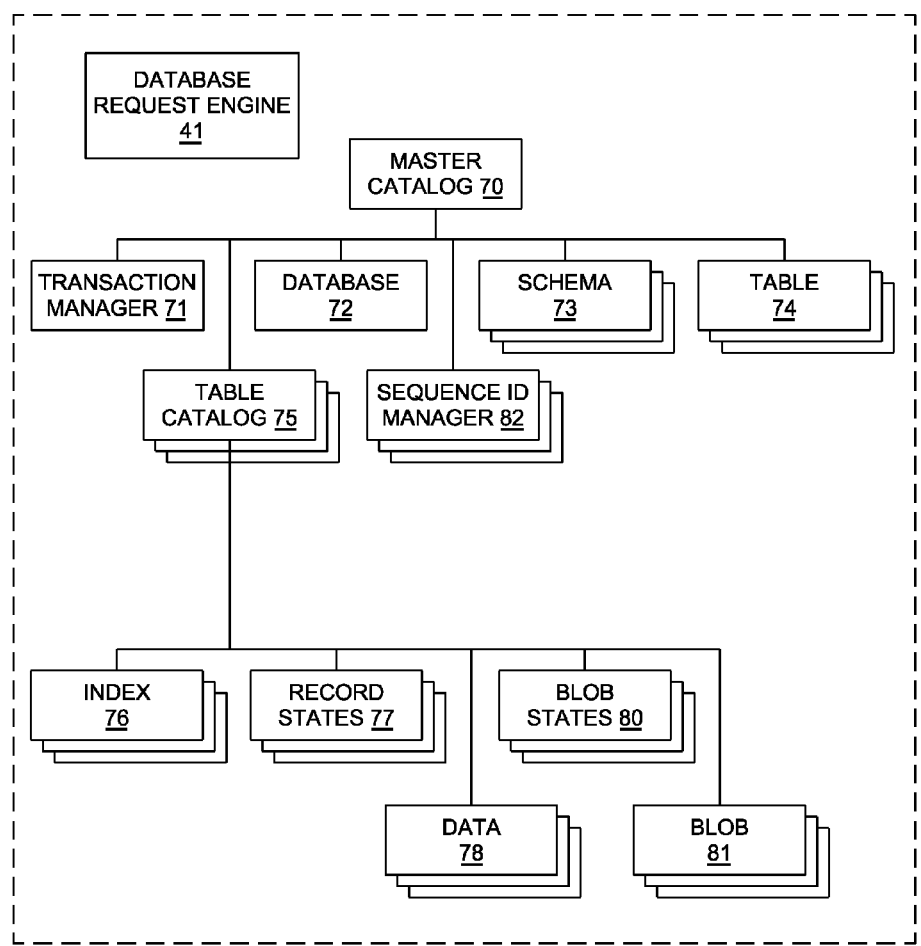
FIGS. 4A and 4B depict the logical organization of "atom" objects generated by atom classes shown in FIGS. 2 and 3 that are useful in implementing this invention and they might appear at any given time in a transactional node.
Figure 4B:
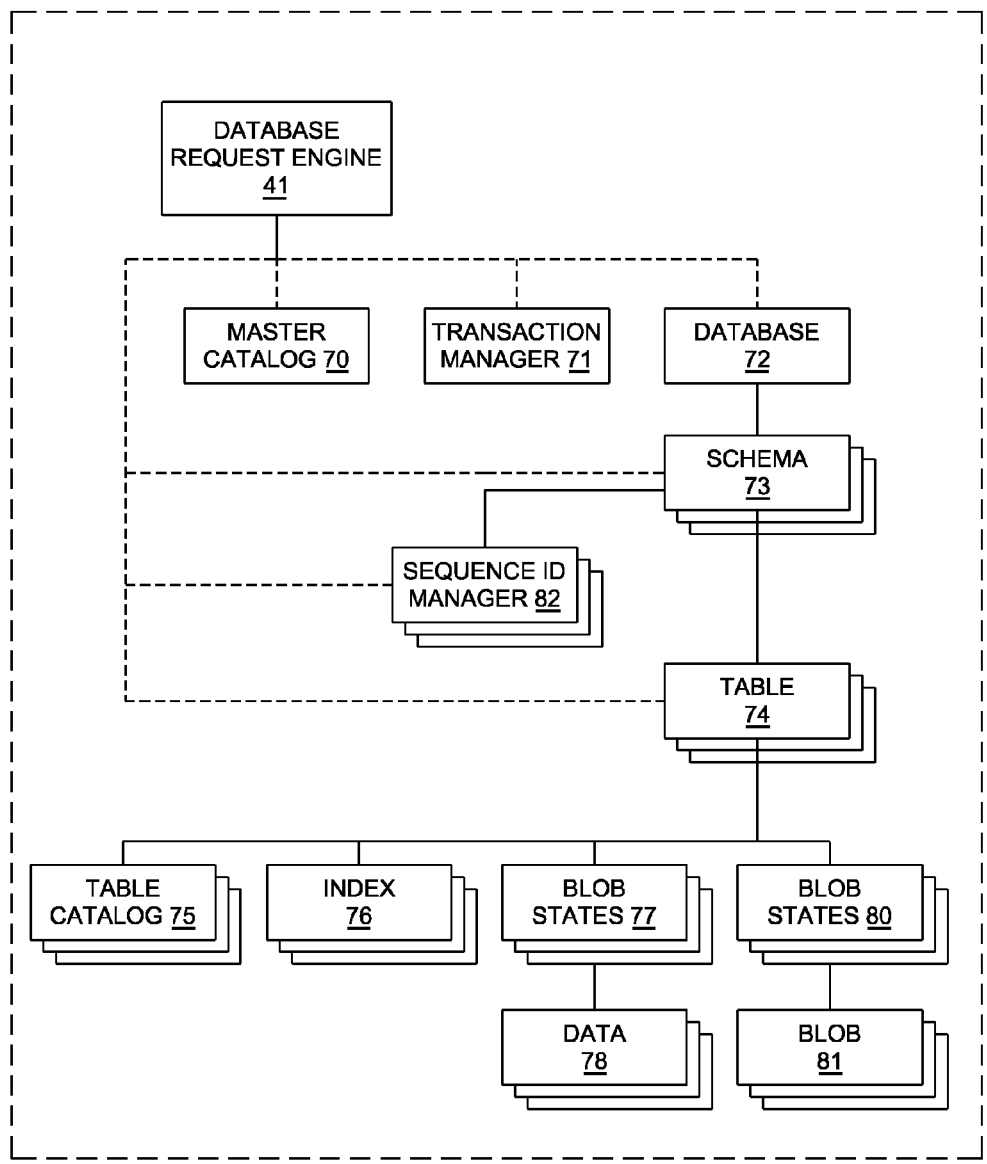

FIGS. 4A and 4B depict the database engine 41 and typical set of atoms that might reside in a transactional node 32 at any given time. In this example, the transactional node hosts a Master Catalog atom 70, a Transaction Manager atom 71, a Database atom 72, a Schema atom 73, a Table atom 74 and a Table Catalog atom 75. There is only one Master Catalog atom 70, one Transaction Manager atom 71 and one Database atom 72 per database. The Transaction Manager atom 71, the Database atom 72 and the Schema atom 73 are created when a database request engine 41 creates a new database.

Referring to FIG. 4A, a Master Catalog atom 70 tracks the status of transactional and archival nodes in database system 30 of FIG. 1. It also can be considered as an active index that creates and monitors the Transaction Manager atom 71, the Database atom 72, each Schema atom 73, each corresponding set of Table atoms 74 and Table Catalog atoms 75, and Sequence ID Manager 82.

The Table Catalog atom 75 acts as an active index and creates and monitors Index atoms 76, Record States atoms 77, Data atoms 78, Blob States atoms 80 and Blob atoms 81 associated with a single table. That is, there is one Table Catalog atom 75 for each table.

FIG. 4B is useful in understanding the interaction and management of different atom types. In this context, neither the Master Catalog atom 70 nor the Table Catalog atom 75 performs any management functions. With respect to the remaining atoms, the Database atom 70 manages each Schema atom 73. Each Schema atom 73 manages each related Table atom 74 and Sequence ID Manager atoms 82. Each Table atom 74 manages its corresponding Table Catalog atom 75, Index atoms 76, Record States atoms 77, Data atoms 78, Blob States atom 80 and Blob atoms 87.

Still referring to FIG. 4B, the database request engine 41 communicates with the Master Catalog atom 70, Transaction Manager atom 71, the Database atom 72, each Schema atom 73, each Table atom 74 and the Sequence ID Managers 82. The database request engine 41 acts as compiler for a high-level language such as SQL. As a compiler, it parses, compiles and optimizes queries and obtains metadata and data from atoms for the formation of the various fragments of data base information.

Each atom has certain common elements and other elements that are specific to its type. Referring to FIG. 5, a Master Catalog atom 70 includes common elements 70A through 70I. Element 70A is a unique identification for the atom. As there is only one instance of a Master Catalog atom that is replicated to all nodes, the Master Catalog atom ID 70A is given a fixed number, typically "1." As a general rule, pointers 70B and 70C identify the Master Catalog atom and the creating catalog atom, respectively. For the Master Catalog atom, both pointers identify the Master Catalog atom itself.

Each atom must have a chairman. The chairman performs functions as described later. Element 70D is a pointer to that node where the chairman for that atom resides.

Each time a copy of an atom is changed at any transactional node, it receives a new change number. Element 70E records that change number.

Whenever a node requests an atom from another node, there is an interval during which time the requesting node will not be known to other transactional nodes. Element 70F is a list of all the nodes for which the supplying node must relay messages to the requesting node from all other nodes that contain that atom until the request is completed.

Operations of the database system are also divided into cycles. A cycle reference element 70G provides the cycle number of the last access to the atom. Element 70H is a list of all active nodes that contain the atom. Element 70I includes several status indicators.

Still referring to FIG. 5, a global node IDS entry 70J contains an ID manger for assigning a unique identifier for each active node in the system. As known, such identifiers are long character strings. A local node IDS entry 70K includes a range of numbers up to the total number of nodes that can attach to the system. Together these entries provide the correspondence between the two types of identification. Use of local node IDS increases efficiency.

When a transactional node joins the database system 30 in FIG. 1, a connection manager 70L effects that process. A specific implementation for enabling the transactional node to join the database system is described later. The joining node uses a pending node status entry 70M to indicate that it will not have a global address for a responding node until it receives further communications from that responding node. A database UUI entry 70N contains the universal unique identification for the database.

The entries at 70P are important because they link all the atoms for which the Master Catalog atom 70 acts as an active index. As previously stated, these include the Database atom 72 and each of Schema atoms 73, Table atoms 74 and Table Catalog atoms 75.

A password entry 70Q is representative of a means for authenticating a connection into the database. Actual and software version entries 70R and 70S allow the system to operate with backward compatibility when a newer version of the software is installed. The actual software entry 70R identifies the software version then in use; the software version entry 70S, the number corresponding to the most recent installed version. This permits individual nodes to be updated to newer versions without requiring other nodes to be updated and without closing the database for access by all nodes.

Still referring to FIG. 5, the Master Catalog atom 70 also includes a pointer 70T to the Transaction Manager atom 71, a pointer 70U to a configuration object, a pointer 70V to a garbage collection thread and a pointer 70W to a ping thread. The ping thread operates periodically and independently of other operations at a node, It "pings" each other node to provide information that can be used in the determination of communications efficiency of a corresponding path. For example, if node N1 in FIG. 1 has the option of communicating with either node N2 or N5, node N1 could use the ping information in the selection of the most efficient of the communications paths to nodes N2 and N5 for that communication. Other selection processes might also be substituted or added.

Referring to FIG. 6, there is one Transaction Manager atom 71 for each database and it is created during the same process that creates the Master Catalog atom 70. The Transaction Manager atom 71 creates, tracks and ends database transactions in response to database commands from the database request engine 41. A Transaction Manager atom 71 includes elements 71A-71I that correspond to like elements in the Master Catalog atom. However, element 71A is the identification of the Transaction Manager atom 71. Elements 71B and 71C both point to the Master Catalog atom 70.

An ID manager 71J provides unique transaction sequence identifications and maintains an active transactions list 71K, a committed transactions list 71L and a failed transactions list 71M. Element 71N stores commit sequence information. The ID manager 71J assigns a transaction ID at the start of each transaction. Each transaction ID is unique, but not necessarily sequential. A local Transaction Manager atom assigns a commit sequence number to element 71N when a transaction commits. Sequence numbers are sequential and each is specific to the node that requested the transaction. A transaction-transition event counter 71P identifies discrete events that occur during each transaction, such as the start of the transaction and the successful committing of the transaction. Such counters are useful when multiple transactions involving the same information overlap.

Referring to FIG. 7, the Database atom 72 is created at the same time the Master Catalog atom 70 and Transaction Manager atom 71 are created. The Database atom 72 identifies each of the Schema atoms 73. The Database atom 72 may be involved with an authentication process when a new user attempts to join the database. It may also include other data concerning the authorization levels.

Basically, the Database atom 72 includes elements 72A-72I corresponding to like elements in FIG. 5. Element 72A is the Database atom identification. Each of pointers 72B and 72C identify the Master Catalog atom 70. A schema name-schema ID registry 72J relates schema names to Schema atom identifications.

Referring to FIG. 8, a Schema atom 73 creates and tracks Table atoms for that schema. A Database atom 72 may manage multiple Schema atoms and each Schema atom may interact with multiple Table atoms. The Schema atom 73 includes elements 73A-73I corresponding to elements 70A-70I in FIG. 5. Element 73A is the unique Schema atom identification 73A and elements 73B and 73C are pointers to the Master Catalog atom 70. A table has an unique name within a schema. A table name-table atom ID registry 73J provides the correspondences between each table name and the corresponding table atom. Each schema sequence has a name. A sequence name-sequence ID manager registry 73K provides the relationship between those names and corresponding sequence ID managers associated with each Schema atom, such as sequence ID managers 82 in FIGS. 4A and 4B.

FIG. 9 provides a logical view of a Table atom 74 that incorporates metadata relating to fields, formats, indices and types and that manages each of the Index atoms 76, Record States atoms 77 and Blob States atoms 80 for that table. It also creates and tracks data within a table. Table atom 74 includes elements 74A-74I that correspond to elements 70A-70I in FIG. 5. Element 74A includes the unique Table atom identification, elements 74B and 74C both point to the Master Catalog atom. Pointer 74J identifies the corresponding Table Catalog atom. Element 74K contains a list of all fields for the table.

Each Table atom has several ID managers. A pointer 74L points to an ID manager that provides each field with a unique identification. Pointers 74M, 74N, 74P and 74Q identify separate ID managers for assigning identifications to Index atoms, Data atoms, Blob atoms and subtypes, respectively. Element 74R is a list of the existing subtypes. Arrays 74S and 74T provide the locations of Record States atoms and Blob States atoms, respectively.

Now referring to FIG. 10, there is one Table Catalog atom for each Table atom. Each Table Catalog atom 75 is created when a Table atom is created. In turn, a Table Catalog atom creates and tracks atoms specific to one table including the Index, Records States, Data, Blob States and Blob atoms. Each Table Catalog atom 75 includes elements 75A-75I that correspond to elements 70A-70I in FIG. 5. Element 75A is a unique Table Catalog atom identification as assigned by the Master Catalog atom. Both elements 75B and 75C point to the Master Catalog atom 70. An ID manager 75J provides unique atom identifications for each of the Index, Record States, Data, Blob States and Blob atoms. A list 75K identifies all atoms associated with a corresponding Table atom. Pointers in element 75L identify the location of each atom at the local node associated with the corresponding Table atom. A series of lists 75M identify, for each atom, a list of the nodes with replications of that atom. Bitmaps 75N provide a convenient means for identifying other objects and directories when the atom is in an archival node.

Referring to FIG. 11, there is one Index atom 76 for each index in a table, and there may be multiple Index atoms per table. Each Index atom includes elements 76A-76I that correspond to elements 70A-70I in FIG. 5, respectively. Element 76A is the unique Index atom identification as assigned by the corresponding Table Catalog atom. Pointers 76B and 76C identify the Master Catalog atom and the Table Catalog atom, respectively. Element 76J contains a binary tree of index nodes to provide a conventional indexing function. Element 76K contains the index level. Such index structures and operations are known to those skilled in the art.

Referring to FIG. 12, a Record States atom 77 manages record versions and state for a fixed range of record numbers within a single table. Thus, a given Table atom may manage multiple Record States atoms. Each Record States atom includes elements 77A-77I that correspond to elements 70A-70I in FIG. 5. Element 77A includes the Record States atom ID that the creating Table Catalog atom assigns. Pointers 77B and 77C identify the Master Catalog and the Table Catalog atoms, respectively. Element 77J is an array for locating all the Data atoms managed by the Record States atom 77. Element 77K contains the record number for a "base record". That is, each Data atom stores multiple records. Element 77 is a pointer to the corresponding Table atom.

In database applications to which this invention is directed multiple users can produce multiple versions of the same record. A preferred embodiment of this invention uses multi-version concurrency control (MVCC) to ensure that a transaction never has to wait for the database by allowing several versions of a record or other object to exist in the database simultaneously. Consequently, each Record States atom 77 includes metadata about each record version. Entry 77M is a bitmap for identifying the location of each versioned record that is useful in garbage collection.

The Record States atom 77 includes, for each version 77N of a record, a transaction ID 77P to identify the transaction that generated the version. A format version entry 77Q identifies the version number for the table sub-type that existed when the record was inserted. This format identifies the physical order of the record and identifies the subtype to which the record belongs of the database program that was in use at the time the record version was created. Element 77R includes a record version sequence number; element 77S, the location of the next older, or previous, version of the record. An index 77T to the data atom array 77J and the base record identification 77K together provide the address for the actual slot 77U in the Data atom with the record version.

FIG. 13 depicts a Data atom 78 with elements 78A-78I that correspond to elements 70A-70I in FIG. 5. In the Data atom 78 element 78A is the Data atom identification 78A assigned by the Table Catalog atom. Elements 78B and 78C are pointers to the Master Catalog atom and to the corresponding Table Catalog atom, respectively. An ID manager 78J assigns a record slot identification for each record in the Data atom 78. Element 78K identifies, for each record in the Data atom 78, the address and length of that record. Element 78C represents data records and versions thereof.

Now referring to FIG. 14, databases also store "blob records." A "blob record" typically is a collection of binary data stored as a single entity in the database. Blob records do not exist in versions. A Blob State atom includes elements 80A-80I that correspond to elements 70A-70I in FIG. 5. Element 80A has the Blob States atom unique atom identification. Elements 80B and 80C are pointers to the Master Catalog and the Table Catalog atoms, respectively. List 80J identifies all the Blob atoms managed by a single Blob States atom 80. Entry 80K provides the identification of the base Blob record. Element 80L points to the corresponding Table atom. For each blob record, the Blob States atom includes an index 80M to the Blobs atom. Element 80N identifies the slot in a Blob atom for the blob record.

FIG. 15 depicts a Blob atom 81 with elements 81A-81I that correspond to elements 70A-70I in FIG. 5, respectively. Element 81A is the atom identification assigned by the Table Catalog atom. Elements 81B and 81C are pointers to the Master Catalog atom and to the corresponding Table Catalog atom, respectively. An ID manager 81J assigns a blob slot identification to each blob in the Blob atom 81. Element 81K identifies, for each blob in the Blob atom 78, its address and length. Element 81L represents all the blob records assigned to the Blob atom.

In summary, each atom has a relationship with only a fragment of the database. For example, the Database atom 72 contains metadata that identifies the schema for the database. Each Schema atom 73 contains metadata that identifies all the tables associated with that schema. For each table, a Table atom 74 and a corresponding Table Catalog atom 75 provide metadata about the table including such information as the identification of fields and their properties. Record States atoms include metadata about a group of records. Data atoms include information about each data record with pointers to slots that contain these records and various versions. Blob States and Blob atoms contain similar information about blob records.

Messages

As previously indicated, communications between any two nodes is by way of serialized messages which are transmitted asynchronously using the TCP or another protocol with controls to maintain messaging sequences. FIG. 16 depicts the basic syntax of a typical message 90 that includes a variable-length header 91 and a variable-length body 92. The header 91 includes a message identifier code 93 that specifies the message and its function. As this invention envisions a scenario under which different nodes may operate with different software versions, the header 91 also includes an identification 94 of the software version that created the message. The remaining elements in the header include a local identification 95 of the sender (i.e., from the Master Catalog atom in FIG. 5) and information 96 for the destination of the message, namely a catalog atom (e.g., a Table Catalog ID 75A in FIG. 10) and an atom identification 97 (e.g., a Record States ID 77A in FIG. 12). From this information, the recipient node can de-serialize, decode and process the message.

FIG. 17 depicts a set of messages having the syntax of FIG. 16 for a specific embodiment of this invention. Each performs a specific function as will now be described.

As briefly discussed previously, when a message is to be sent, there are different communications paths to different nodes. For example, if one node, as a requesting node, needs to obtain an atom, replications of that atom may be located in multiple other nodes. In this embodiment, "pinging" provides selection information useful for selecting the best path corresponding node. Pinging, as known, involves determining time for a "ping" command to reach its destination and for an acknowledgement message to be received. In this embodiment of the invention, each node periodically uses a helper class to send a Ping message 110 to each of the other nodes to which it connects. Each receiving node uses a helper class to return a Ping Acknowledge message 111 that contains the ping time. Each node accumulates this information about the time to send and receive these messages in a node object described later with respect to FIG. 8. When one node prepares to send a message to one of multiple nodes, the transmitting node analyzes factors including, but not limited to, the accumulated ping data to select one of the nodes as the receiving node for that message.

A next set of messages are involved with the connection of a new node into or previously inactive node back into the database system 30 in FIG. 1. When such a node, e.g., transactional node N2, wishes to connect to the database system 30, it initiates a connection process described in detail later with respect to FIG. 19. Referring to FIG. 17, once that process identifies an active node for receiving messages, the joining node sends a Connect message 112 to the selected node. The selected node returns a Welcome message 113 and a New Node message 114 to all other connected nodes in the database system 30. Each of the other connected nodes transmits its own Welcome message 113 to the joining node. When this message sequence completes, the joining node can then take further steps to obtain various atoms.

Archival nodes can operate in either an active mode or a synchronizing mode when they are synchronizing to another node. A helper class in the archival node transmits a Node State message 115 to alert all other nodes of any status change in that archival node.

A next set of messages are involved when a node, as a requesting node, retrieves a copy of an atom from another node. For example, after a node joins the database system 30 in FIG. 1, it generally requests a copy of the Master Catalog atom. The process is described in greater detail in connection with the explanation of FIGS. 20 and 21.

Still referring to FIG. 17, the requesting node issues an Object Request message 116 to a selected node which generally returns an Object message 117 with the requested atom. The selected node also sends an Object Available message 118 to all other nodes with that atom. Each node that receives an Object Available message 118 from the selected node returns an Object Acknowledged message 119 to the selected node. The selected node sends an Object Complete message 120 node to the requesting node after the selected node receives all the Object Acknowledged messages 119.

In some situations the selected node sends an Object Unavailable message 121 to announce that the selected node has dropped the requested atom. A Bounce Object message from the selected node indicates that the requested atom is not found in the Master Catalog atom or one of the Table Catalog atoms. This may occur when an update transaction is underway and the selected node does not respond to the Object Request message 116 because the garbage collection process has collected that atom before receiving the Object Request message. As a response, the requesting transactional node can select another node in the database system with the atom.

The database request engine 41 in FIG. 1 and FIGS. 4A and 4B can periodically generate a Register Object message 123 or an Unregister Object message 124. These messages are directed to atoms that include a registry, such as Database and Schema atoms. An Object Delete message 125 is sent from a node when a user at that node issues a command to delete some item, such as a table.

Whenever a local node is updated or modified, its change number is incremented. Every replication message contains that atom's local change number. Every atom tracks the most recent change number for each node. When an archival node receives a copy of a modified atom, it copies the change numbers for the atoms, clears the change numbers and then serializes the atom to disk. If a change has been made, the change number will not be zero. The archival node sends an Object Written message 126 with the change number written to each node. Each receiving node compares it own change number with that in the message. Then the node can update the status for the atom to note that the atom has been archived and is a potential candidate for garbage collection.

As previously indicated, each atom must have a unique identity. When a first atom of a particular atom type (e.g., a new Table atom) is created, the creating transactional node is designated a Chairman for that Table atom. Rules for governing the "chairmanship" are discussed later. Whenever a transactional node needs to create a new atom type, it sends an ID Request message 127 to the Chairman if it does not have an available identification. The Chairman generally returns an ID Delegation message 128 which includes a block of at least one unique identification from its allocation of free identification values. This process is described in greater detail with respect to the process of FIG. 20.

Referring to FIGS. 4A and 4B, a Table atom 74 can send any of a number of messages. If the database request engine 41 initiates a process for adding a new field, the Table atom at that corresponding transactional node generates the new structure and sends a Table Field Added message 129 that replicates the change to all other nodes that include that Table atom. If a transactional node updates a field, a subtype or field characteristic that changes the table format, that node issues a Table Format message 130. A Table Request Records message 131 is generated whenever a node needs to create a new Record States or Blob States atom. Only a chairman can create this atom; and the chairman broadcasts a Table Records Object message 132 when this occurs.

Each time a transactional node inserts a new record in a table, it produces a Table Record message 133. Whenever it becomes necessary to create a new index, as when an indexed field is added to a table, the creating Table atom replicates the new Table atom. At this time, the index is set to be a write-only index. After all the related processes involved have been completed, the node sends a Table Index Added message 134.

Any time a Table atom creates a Blob States atom for a blob, the Table atom generates a Table Blobs Object message 135. A Table Blob message 136 indicates that a new blob has been created.

In a database that utilizes types and sub-types, the database request engine 41 in FIG. 1 will generate commands to cause a Table atom to assign a new table-type identification. When this occurs, a Table Type message 137 is replicated to all nodes with like Table atoms.

A Table Record Expunge message 138 provides the record number on specific Record States atom. A Table Garbage Collect message 139 is generated by a Chairman for a Table atom when it is determined that a record within that table contains an unusually long chain of back versions or other criteria. The result is that "unused" atoms are "emptied" of data.

A Record States atom 77 in FIGS. 4A and 4B also produces several specialized messages. If it becomes necessary to update a particular record, the database management system of this invention creates a new version of that record. Referring back to FIG. 17, the corresponding Record States atom generates a Record Update Request message 140 that is directed to the Chairman for that atom to seek permission to update that particular record. The Chairman responds by generating a Records Update Response message 141 that grants or denies permission to update that record. If the Chairman grants permission, the requesting Record States atom performs the update and sends a Records Update message 142 with the new version of the atom to each node with a copy of that atom.

A Data atom stores up to some maximum number of records and versions thereof. A corresponding Record States atom monitors the size of the Data atoms it manages. If a Record States atom determines that a managed Data atom has exceeded that size, it generates a new Data atom and replicates that new Data atom by means of a Records Data Object message 143.

A Record States atom generates a Records Record message 144 for replicating any new record version. Periodically, a Table atom Chairman initiates a process by which a Record States atom identifies record versions that are older than the oldest active transaction. When this occurs, the Chairman's Record State atom transmits a Records Prune message 145 that enables those older record versions to be deleted during a subsequent garbage collection process. If a situation arises wherein it becomes necessary to rollback a transaction, a Record States atom generates a Backout Record message 146 that updates the backout record.

There is also a set of index-specific messages. As known an index has an optimum maximum size; and if the index exceeds that size, the index should be split. In accordance with this invention, only a Chairman can split an Index atom. The Chairman can do this unilaterally or in response to an Index Split Request message 147 from another copy of that atom. When the Chairman causes the split, the Chairman generates an Index Split message 148 that contains a split index. After the split, the Chairman sends an Index Prune message 149 to truncate the original Index atom following the split. Each time an index node is added to the index, it generates an Index Node Added message that contains an index key, record identification and other information for the new index. When an index has been fully populated and therefore is ready for use during retrieval operations, a Table Index Ready message 151 is generated. As previously indicated, adding a table index generates an Index atom that is a write only index and that is not readable. The Table Index Ready message 151 makes such a write-only index readable.

A Blob States atom identifies a slot in a Blob atom by generating a Blobs Blob message 152.

A Data Record Message 153 contains the slot number and the record length. It also includes the data record.

As the state of a transaction changes, the Transaction Manager atom 71 for a given transactional node generates Transaction State messages 154. These indicate whether the current status of the transaction is in an active state, a pre-commit state, a commit state or a rollback state. Under certain circumstances it is possible that a request related to one transaction will be blocked by another transaction on another node. In that event, the Transaction Manager atom receives a Transaction Blockage message 155. If a transaction is deadlocked and must be rolled back, the Transaction Manager atom associated with the node causing the deadlock generates a Transaction Deadlock message 156 causing the transaction to be rolled back.

The Master Catalog or any Table Catalog atom on an archival node can request the time an atom was last written. This occurs when a requesting node sends a Request Write Times message 158. The recipient of that message then returns those requested times in a Write Times message 159.

The foregoing messages constitute a set by which the various procedures needed to maintain a database management system incorporating this invention can be handled properly. As will be apparent, each message has a minimum of overhead in a header. Each message can be reasonably short. When used with TCP or other messaging protocol, the messages must be sent sequentially and, at any given node, on receipt they must be handled in the same sequence in which they were sent even by different nodes.

Methods

It will now be helpful to a further understanding of this invention to describe some basic methods that relate to various aspects of the operation of this invention. Variations from each will be apparent to those of ordinary skill in the art.

Figure 18:
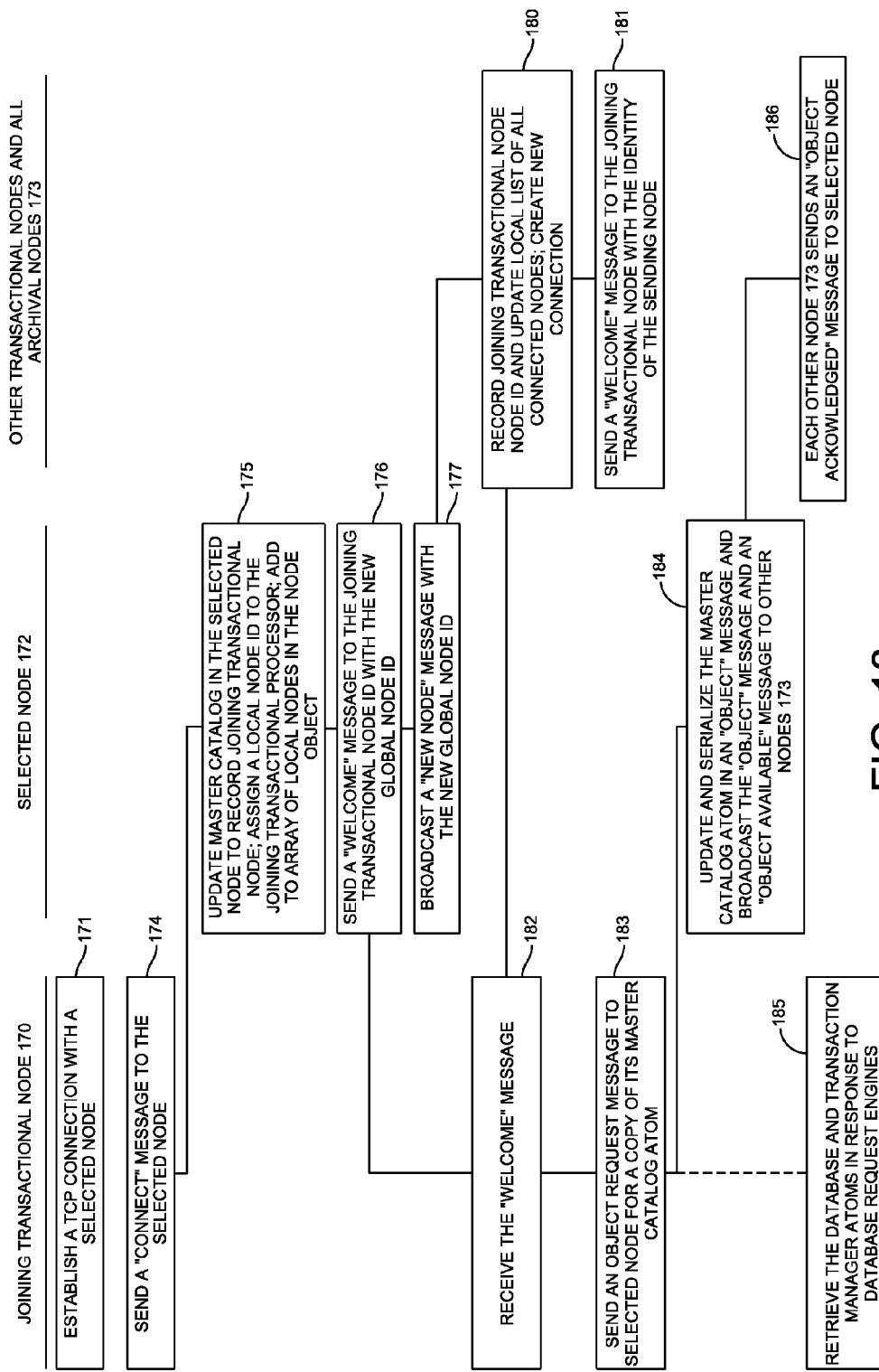
FIG. 18 is a flow diagram useful in understanding the method by which a node joins the database system in FIG. 1.

FIG. 18 is a flow diagram of the operations that occur in different nodes in the database system 30 of FIG. 1 when a node joins the network. For purposes of this description, assume that Node 5 in FIG. 1 is to join the database system; it is designated to be joining transactional node 170. As a first process, the joining transactional node 170 uses step 171 to establish a TCP connection with a selected node. Basically, the joining transactional node 170 sends a message to a fixed location that identifies a database. A connection broker, not shown but as known in the act, responds to this request by denying or granting access to the database system. If the connection broker grants access, it selects a node, such as transactional node N1, as a selected node 172. Then the connection broker sends a message to the joining transactional node 170 with a designation, as by a port number, of the selected node 172. FIG. 18 also represents as a group 173 all other active transactional and archival nodes in the database system.

Once the connection is established in step 171, the joining transactional node 170 uses step 174 to send a Connect message to the selected node 172. The selected node 172 responds to the Connect Message at step 175 by updating its Master Catalog atom with its connection manager, assigning a local node ID to the joining transactional node 170 and adding that node to an array of local nodes in its node object, an example is shown in FIG. 19.

FIG. 19 depicts a node object such as described in connection with step 175 of FIG. 18. It contains a pointer 400A to the socket for the node and a pointer 400B to the Master Catalog atom at the node and a pointer 400C to the connection manager in the Master Catalog atom. Pointer 400D identifies the thread used to listen for incoming messages and pointer 400E identifies a socket buffer for receiving messages. The message listener waits for a message, determines the message type and then processes the message to completion.

The node object 400, like all the atoms, includes a global node ID 400F and a local node ID 400G of the node to which this node is listening. Element 400H is a pointer to a queue of messages that are waiting to be sent from the node. Elements 400I and 400J contain the identifications for the local port and the remote ports. Element 400K contains the version number for the software operating at the remote node. A node type element 400L indicates whether the remote node is a transactional node, an archive node undergoing a synchronization process or an on-line archival node.

Element 400M contains the name for the local node; element 400N, the name for the remote node. Element 400P is a pointer to the current message being processed. Elements 400Q and 400R identify the time of the last ping operation and the ping time. As previously indicated, each node generates a sequential commit sequence number in response to each commit operation for a transaction initiated at that node. Element 400S contains this number. Element 400T indicates whether this node object is the node object for this node.

Referring back to FIG. 18, at step 176 the selected node 172 sends a Welcome message to the joining transactional node 170 that contains the global node ID. Then, the selected node broadcasts a New Node message in step 177 to the group 173 of all other transactional and archival nodes.

Each node in the group 173 responds to the New Node message by recording the global ID and assigning a local ID of the joining transactional node and updating a local list of all connected nodes in their respective Master Catalog atoms at step 180. Each then uses step 181 to send a Welcome message to the joining transactional node 170. Upon completion of this process, the joining transactional node 170 has a full list of all the active nodes including the selected node 172 and all the nodes in the group 173.

When the joining transactional node 170 receives the Welcome message from the selected node at step 182, it sends an Object Request message (step 183) to the selected node 172 requesting a copy of the Master Catalog atom. After the selected node 172 has updated the various items of information in its Master Catalog atom, the selected node implements step 184 to serialize its Master Catalog atom in an Object message that is sent to the joining transactional node 170 and broadcasts an Object Available message to all the other nodes in the system. Thus, the Master Catalog atoms in each node are updated and synchronized.

Without waiting for the receipt of the Object message, the joining transactional node can also begin the process of step 185 for retrieving a copy of the Database atom and the Transaction Manager atom from the selected node 172.

Each other node that receives the Object Available message responds in step 186 by sending an Object Acknowledged message back to the selected node.

The database request engine in the joining node initiates this sequence. Thus, when the method of FIG. 18 has been completed, the joining transactional node 170 is connected to the database system and, as shown in FIGS. 4A and 4B, includes a copy of the Master Catalog atom 70, Transaction Manager atom 71 and the Database atom 72. The joining transactional node 170 thereafter will either create or obtain copies of other atoms on an as-needed basis.

Figure 20:
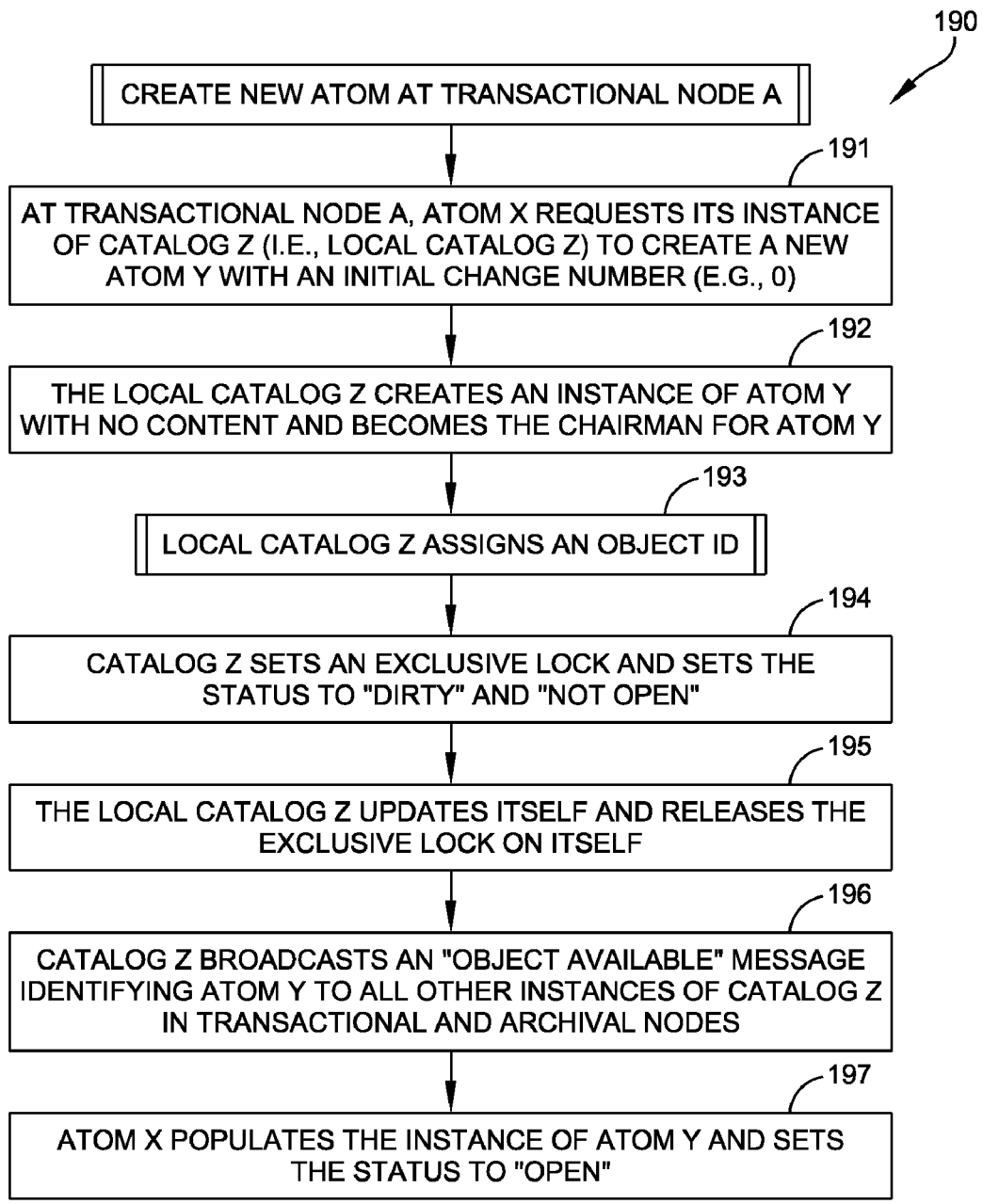
FIG. 20 is a flow diagram useful in understanding the method by which a node creates an atom in accordance with this invention.

During some operations, a transactional node might create of a new table, necessitating the creation of a new Table atom. FIG. 20 discloses that process 190 where node A is a requesting node, atom X is the atom that requests and will manage a new atom Y. For creating a new Table atom Y, atom X would be a Schema atom and the local catalog Z would be the Master Catalog atom. Step 191 represents preparatory functions for the request to obtain an instance of atom Y. Each time an atom is changed, it is assigned a change number; the initial value typically is "0".

At step 192, the local catalog Z creates that instance of atom Y with no content and designates the local node as the chairman for atom Y. Then a process 193 allows the local catalog Z to assign an object ID to new atom Y. The specifics of such a process are shown and described with respect to FIG. 21.

Next, the local catalog Z sets an exclusive lock to allow changes to it to occur without any influences from outside automation. While the lock is in place, the local catalog Z sets the status of new atom Y to a "dirty" status and to a "non-open" status. The "dirty" status indicates that the new atom Y has not been replicated to an archive. The "non-open" status indicates that the new atom Y is not yet available to other nodes. At step 195 the local catalog Z updates itself and then releases the exclusive lock. At step 196 catalog Z broadcasts an Object Available message identifying atom Y to all other instances of catalog Z in the transactional and archival nodes.

At step 197 atom X, as the managing atom for new atom Y, populates the instance of atom Y and sets the status for atom Y to "open" indicating that the new atom can be replicated. Some time thereafter an archival node will save a copy of the new atom to persistent storage. That is, the archival node will respond to the receipt of the Object Available message by requesting a copy of atom Y thereby to provide the redundancy. When this is complete, the receipt of a Object Acknowledged message from the archival node will cause the "dirty" status to be changed and this change will then be reflected to all other nodes that have a copy of atom Y.

Figure 21:
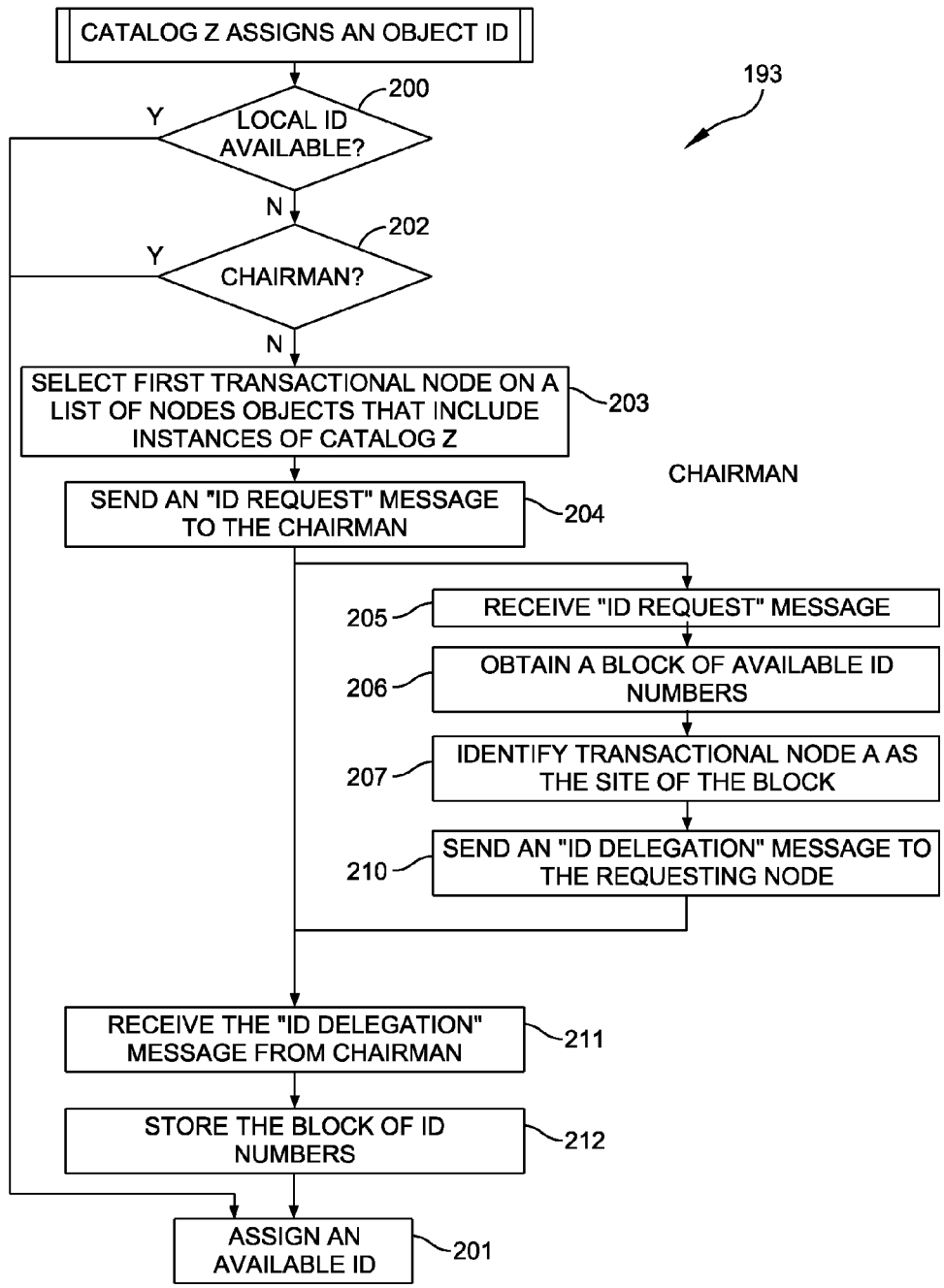
FIG. 21 is a flow diagram useful in understanding the method by which unique atom identifications are assigned during the method of FIG. 20.

The assignment process 193 in FIG. 20 and like assignment processes are used in various stages of the operation of this invention for assigning object IDs. FIG. 21 depicts this assignment process in greater detail. Specifically, when a catalog atom wants to assign an object ID it determines at step 200 if it has a local ID available to it. If it does, control passes to step 201 that assigns the available ID in response to the request. If a local ID is not available, control passes to step 202 to determine whether the catalog atom at this node has a "chairman" status. If it is, the chairman has the authority to identify available IDs directly and control passes to step 201.

As will be recalled, when at least one other node exists for the particular atom, each atom contains a list of nodes that include copies of the atom being requested. If this were a first request for the atom after that atom had been created in accordance with the process of FIG. 20, the corresponding catalog in the first node on the list is the chairman. Step 203 represents the process of selecting a node and identifying the chairman. For the selection process, it is preferred to establish communications with a transactional node first. Step 204 represents the transmission of an ID Request message to the chairman.

When the chairman receives the ID request message at step 205, it obtains a block of available ID numbers (step 206). The chairman identifies the transactional node making the request as the site of this block of available ID numbers (step 207). Then the chairman sends an ID delegation message at step 210 to the requesting node. When the requesting node receives the ID Delegation message from the chairman at step 211, it stores the block of ID numbers at step 212 and then selects the first available ID for assignment in step 201. Referring back to FIG. 20, in that situation the process 193 transfers from step 200 to step 202 directly to step 201 because the chairman is designated in step 192 at FIG. 20.

Figure 22:
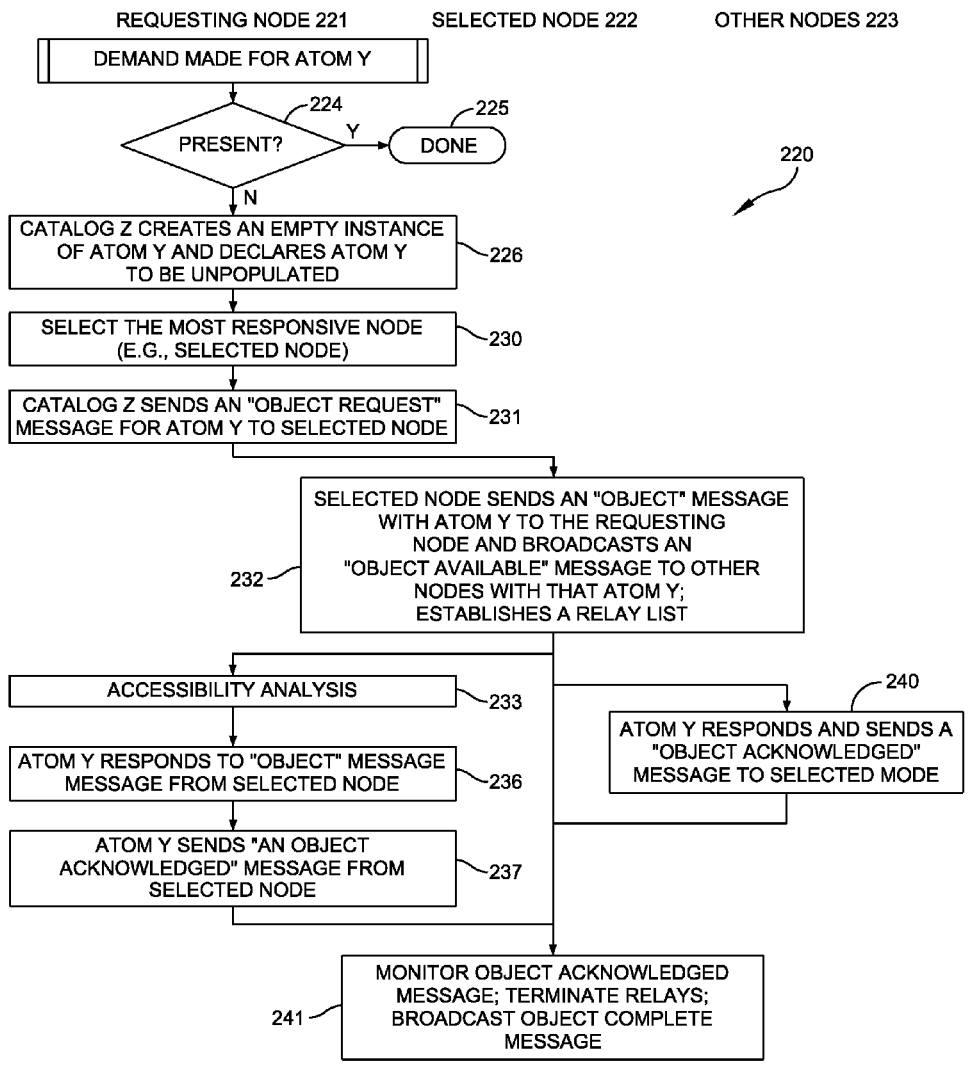
FIG. 22 is a flow diagram useful in understanding the method by which one node obtains a copy of an atom from another node.

Whenever the Database engine 41 in FIGS. 4A and 4B makes a request for an atom, a response 220 in FIG. 22 is processed. For example, assume that the database request engine 41 in a requesting node 221 asks for a copy of atom Y (e.g., a Table atom) from a selected node 222 in a database with other nodes 223. When the database request engine 41 makes that demand, step 224 determines whether atom Y is present in the requesting node 221. If it is, step 225 terminates the process because the requested atom is present. If it is not, control transfers to step 226 whereby a local catalog Z creates an empty instance of atom Y and declares atom Y to be "unpopulated." If the Database engine 41 were requesting a Table atom 74, the Master Catalog atom 70 would perform this step. Step 230 then uses the previously described selection process to identify a selected node 222. The preference is to select any of the transactional nodes before selecting the most responsive archival node as the selected node 222.

In step 231, the requesting node 221 sends an Object Request message for atom Y to the selected node 222. In response, the selected node 222 uses step 232 to send an Object Message with the requested atom Y in its serialized form with the node and sequence numbers.

At the same time, the selected node 222 broadcasts an Object Available message to all other nodes 223. It also creates a relay list for all other nodes with a copy of atom Y. At this point in the process, the other nodes do not communicate directly with atom Y in the requesting node because they are not aware that they should be sending replication messages for that atom to requesting node. Therefore, when any of the other nodes replicates its atom Y, the selected node 222 will relay the message to the requesting node 221.

When the Requesting node 221 receives the Object message from the selected node 222, it conducts an accessibility analysis of the message at step 233. If the message contains a current atom, atom Y processes the message at step 236 and sends an Object Acknowledged message to the selected node at step 237.

All other nodes 223 use step 240 to respond to the Object Available messages by sending an Object Acknowledged message to the selected node 222. The selected node 222 uses step 241 to monitor the Object Acknowledged messages. Specifically, it removes each of the other nodes from its relay list in response to each Object Acknowledged message and ceases relays to that node. When all the other nodes 223 have been removed from the list, the selected node stops all relaying and broadcasts an Object Complete message.

It is possible for another node to send a replication message that reaches the requesting node 221 during the time between steps 226 and 236 in FIG. 22. This can interrupt message processing. Consequently, when a replication message for atom Y in the above example is received at the requesting node while atom Y is unpopulated, it is placed in a pending message list that is part of each atom, although not shown in any of FIGS. 5 through 13.

Figure 23:
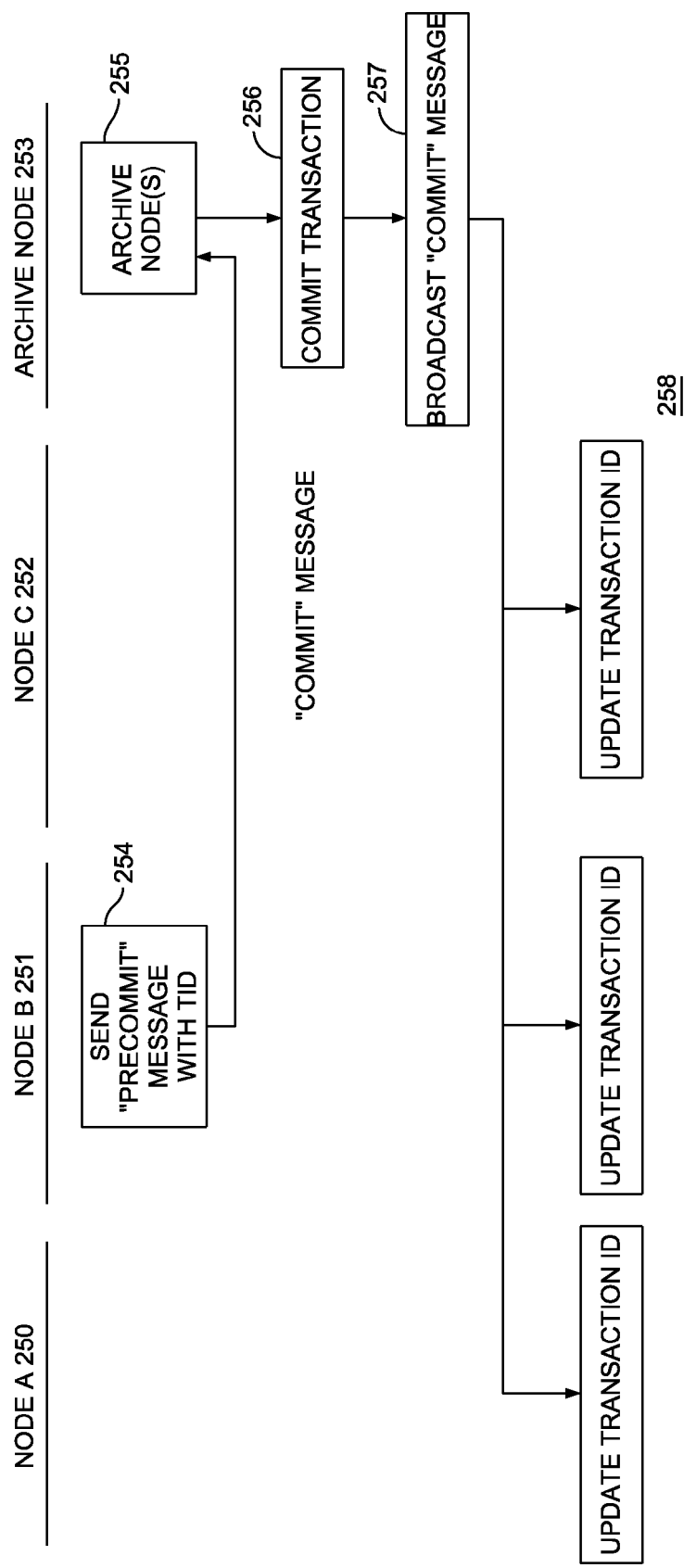
FIG. 23 is a flow diagram useful in understanding a method by which this invention commits a transaction.

As previously indicated, this invention is particularly adapted to a database that interfaces with transactional processing techniques. As such, an appropriate approach for "committing" messages should be involved. FIG. 23 depicts one approach that assures the consistency of data in such an environment. Specifically, FIG. 23 depicts four nodes, namely: transactional node A 250, transactional node B 251, transactional node C 252 and archival node 253. It is assumed that transactional node B 251 sends a Precommit message with a transaction ID supplied by the Transaction Manager atom at that node at step 254. The message is routed to the archival node at step 255. When all the conditions for committing that transaction have been completed, the archival node 255 issues a commit transaction message at step 256 and, at step 257, broadcasts that commit message. Each of the transactional nodes updates its corresponding transaction number in response at step 258.

As previously described with respect to the process for requesting a copy of an atom in FIG. 21, the requesting node performs the accessibility analysis upon any received message at step 233. This test provides assurance that any transactional node always operates with valid information and involves an analysis of transaction ID numbers and commit sequence numbers. An understanding of this analysis and other features of this invention will be facilitated by a further understanding of transaction IDs and commit sequence numbers, by an analysis of the relative order of transactions and by an understanding of "atom skew."

With respect to transaction IDs and commit sequence numbers and as previously stated, each transaction identifier is unique across the entire database system of FIG. 1. The purpose of a transaction ID is to be a unique, permanent, system-wide mark indicating which transaction created a specific record version. Each transaction ID is assigned by a local copy of a Transaction Manager atom 71 and one such Transaction Manager atom will be the chairman that assigns blocks of identifier numbers to the Transaction Manager atoms on each transactional node in the database system. A Transaction Manager atom at a given transactional node assigns an unused number in an assigned block in order to each transaction that node starts. As a result, the transaction IDs of newer transactions started at a given node can be higher than the transaction IDs assigned to older transactions started on that same node. However, on a system-wide basis the transaction IDs do not imply anything about the relative start times of different transactions.

Consequently, some method must be provided to assure that a transaction can read a record version only if the transaction that created the record version had committed before the reading transaction started. In this invention such a method for determining which record version to read is the transaction commit time for the transaction that created the record version, not the start time. A transaction ID does not contain its commit time, so the Transaction Manager atom on each node assigns a commit sequence number to each transaction based upon the actual commit operation. Each transactional node generates its commit sequence numbers in an increasing sequence. If a transaction from a given node has a commit sequence number of 467, all transactions from that node with lower commit sequence numbers are certain to have been committed. All nodes generate the same commit sequence numbers, so interpreting the numbers requires both the number and the identification of the corresponding node.

When a transaction commits, its Transaction Manager atom sends a Commit message to all nodes that include the corresponding transaction ID and commit sequence number. When an atom serializes itself, it includes the highest commit sequence number that it has seen from each node that holds a copy of that atom. For example, assume nodes A, B and C contain copies of an atom Z and that node A generates a Object message for atom Z. The serialized form of that message will include the highest commit sequence number that node A has seen from itself and the highest commit sequence numbers it has seen from nodes B and C. The serialized message from node A describes the state of transactions on all nodes that share a copy of atom Y as node A sees it. It is possible that node B or node C may have actually issued higher commit sequence numbers for transactions that node A has not yet received or processed.

The Transaction Manager on each node maintains a transaction object for each node in the database system. Each transaction object reflects the state of transactions on all nodes and assigns each object two more numbers that are local and continuously increasing. When the Transaction Manager atom starts a transaction or receives a transaction transition message that indicates that another node has started a transaction, the Transaction Manager atom creates a local transaction object with the new transaction ID and assigns it a start number. When a local transaction commits or when Transaction Manager atom receives a transaction transition message that indicates that a transaction on another node has been committed, a transaction end number is assigned to the transaction object along with the commit sequence number. The start and end numbers come from the same sequence. As an example, if Transaction 123 has a start number that is higher than the end number of Transaction 453, Transaction 123 can read record versions created by Transaction 453 from any node that executed Transaction 453.

Transaction start and end numbers are local; that is, they reflect the state of transactions as seen on the local node. Different nodes assign different values and see different ordering of transactions on other nodes. As will be apparent, delays can exist in receiving and in processing Transaction State messages. Each transaction runs only on its local transactional node. This database system prevents one transaction node from "seeing" a transaction as committed before the transaction commits on its local transactional node. For example, if node A starts Transaction 123 after receiving and processing the commit message from transactional node B for Transaction 453, Transaction 123 can read the changes from Transaction 453, even if a transactional node C that received the transaction commit and start messages in another order and considers the two transactions to be contemporary.

As neither of the transactions runs on transactional node C, the information is not relevant to transactional node C. However, the difference between the view of the database system by each individual transactional node can cause problems in certain circumstances.

With respect to "atom skew", in accordance with one aspect of this invention, each node must process messages from another node in the order that the other node sent the messages. However, all nodes operate independently. Thus, at any given time, some nodes will have received and processed messages that other nodes have not yet processed. Some copies of atoms will include changes that other copies do not. Those differences do not matter to any node that has a copy because each copy of the atom is in a consistent state for that node. As previously described, whenever a transactional node changes an atom, the node replicates the changed atom to all other nodes that contain a copy of that atom. If transactional nodes B and C each contain a a copy of that atom and transactional node B changes that atom, transactional node B sends replications messages to transactional node C. While transactional node B is processing a transaction, it sends a Transaction State message to transactional node C and replicates any atoms that transactional node B changes. When transactional node B commits the transaction by the process shown in FIG. 23, transactional node C should have received the Transaction State message indicating that the transaction has been committed. Transactional node C will process all the messages related to the transaction before it receives the Commit message due to the fact that all messages will be processed in the order in which they were sent. Copies of atoms on different transactional nodes can differ, but all changes made by a transaction on any transactional node will be on every other node before the other node sees the transaction as committed.

When viewing transactions from the system level, different transactional nodes are not acting in synchronism. The times for a single message being processed by different nodes can vary due to differences in the efficiency of the communications path and the number of messages that each transactional node needs to process. The differences in processing times at different nodes must be taken into account. Consider three transactional nodes: node A, node B and node C. Assume that node B executes a transaction 768 that changes atom X and that node C has a copy of atom X. Assume that atom X at node B sends change messages to node C and that there is some time lapse before node C processes those changes. Assume also that node B has assigned a commit sequence number of 47 to Transaction 768. The Transaction Manager atom on node B sends a Transaction State message to all nodes in the database system. Also assume that node A requests a copy of atom X from node C after receiving the commit message from node B, but before Node C completes processing the transaction. Node A receives and processes the Transaction State message from node B. From the perspective of node A, transaction 768 is committed and the highest commit sequence number for node B is 47. However, with this timing, the atom returned from node C does not reflect the changes made by the transaction at node B.

In accordance with this invention, when atom X on node C serializes itself for transmission to node A, it includes the highest commit sequence number from each node that has a copy of atom X. In this case, assume that the message would include a commit sequence number 97 for node C and 46 for node B.

Referring to FIG. 22, node A as a requesting node creates an empty instance of atom X before asking node C for its contents. The accessibility analysis in FIG. 22, obtains the current highest commit sequence number for each node as seen by node A. It also expands the serialized message with Atom X to obtain the current highest commit sequence numbers for each node as seen by node B. In this comparison, the accessibility analysis will determine that the serialized commit sequence number in the message is 46, while its local highest commit sequence number for B is 47. Thus, Node A cannot use the serialized version of atom X in its current state and must wait for atom X on node C to send it an Object Complete message. If the commit sequence number is the same or higher, node A can continue to process the atom.

As previously stated, when node C sent the serialized copy of atom X to node A, it sent an Object Available message to other copies of atom X, in this case, to the copy on node B. Atom X on node B sends an Object Acknowledged message to atom X on node C and adds the copy on node A to its list of copies of itself Thereafter, atom X on node B will send change messages to its copies on both nodes A and C. Meanwhile, atom X on node C processes the messages from node B, relaying them to node A. Atom X on node A processes the messages, bringing itself more and more up to date. When atom X on node C processes the Object Acknowledged message from atom X on node B and all other copies of atom X on other nodes, it sends an Object Complete message to atom X on node A.

In accordance with this invention each transactional node should operate without having to transfer any atoms to disk or other persistent storage. This requires removal of inactive atoms from each transactional node in an expeditious manner. To achieve this goal, a helper class in each node provides a garbage collection function called by a cycle manager periodically to initiate a new garbage collection cycle independently of other operations. More specifically, the cycle manager performs an aging cycle whereby any atom referenced in a previous cycle is moved to the front on a least recently used (LRU) list in the Master Catalog atom for the node. The cycle manager obtains an exclusive lock to assure that no other threads are active with respect to a previous cycle.

The cycle manager then starts the record garbage collection thread for a table atom that is marked for record garbage collection. If the current amount of memory at the node exceeds a specified amount defined by a configuration object identified by the pointer 70U at FIG. 5, the garbage collection thread process loops through the Master Catalog LRU from the least recently used to the most recently used atoms. It classifies an atom as a candidate for a garbage collection candidate if that atom: (1) is not active, (2) has not been referenced in the current aging cycle, (3) is not "object incomplete" atom, (4) has been changed locally and not yet written to an archival node and (5) is a catalog that has no memory resident atoms. An atom in an archival node additionally must not have been serialized to disk.

If the garbage collection process determines that all the foregoing conditions have been met, there are two options. If the node is an archival node and there are other instances of the atom at other nodes, the content of the atom is "purged". Otherwise the atom is requested to drop itself which it does by first checking with its creating catalog atom for a final test. If that test is passed, the catalog atom clears its pointer to the candidate atom which broadcasts an Object Unavailable message to other nodes that contain instances of the candidate atom and then deletes itself This loop continues on an atom by atom basis until the working memory is within acceptable limits.

Two mechanisms are involved with this process. When a Catalog atom is asked to find an atom for classification, the Catalog atom sets its cycle reference entry to the current cycle number. In addition, Transaction Manager, Database, Schema, Sequence and Table atoms obtain a shared lock on a current cycle so that methods in those atoms can hold atom pointers without having to increment an atom use count to prevent an object or an atom from being garbage collected.

FIGS. 19 and 20 discuss "chairmanship." As indicated in FIG. 20 when an atom is created, the creating node is designated as the atom chairman and establishes an ordered list of nodes for the atom. When a node creates an atom, it is the only entry in the ordered list. The first node in the list is the chairman.

When another node later requests a copy of that atom, the selected node places the identification of the requesting node in the ordered list just after itself, whether it is the chairman or not. As a result, if the node designated as a chairman for any atom becomes inactive for any reason, every other copy of that atom has the ordered list of nodes. Going through the ordered list, the next chairman is the first remaining transactional node on the list. If there are no transactional nodes on the list, the first non-synchronizing archival node is designated.

It may now be helpful as an aid in understanding the interaction among different nodes and atoms within a node to discuss a simple database query. Assume the database request engine at a transactional node receives a database query to select all records in a table "member" with a postal code of "01944." It is assumed that the Transaction Manager atom and Table atom are located at the local node, that all query processing has been completed and that an Index atom exists for a "zip" field in the "member" table.

Initially the database request engine 41 in FIG. 2 issues a command to the Transaction Manager atom to begin a new transaction whereupon the Transaction Manager atom assigns a transaction ID. Next, the database request engine utilizes the Table atom for the "member" table to determine if an Index atom exists for the "zip" field. If these two atoms are at the local node, they are processed. If they are not, copies of these atoms are obtained from other nodes before processing continues.

The Table atom for the "member" table utilizes information from the corresponding Table Catalog atom to scan the index. This produces a bitmap that identifies each "record" in the "member" table with the specified zip code. As will be apparent, this bitmap may be limited to a particular field or maybe the result of the logical combination of indexes from multiple fields.

Next, a loop is established based upon the resulting bitmap. For each iteration of the loop, the database request engine issues a call to the Table atom to process a fetch record method specified with the transaction ID in the record. The Table atom selects an appropriate Record States atom that is related to a Record atom by dividing the record number by a fixed number that corresponds to the maximum number of record IDs a Record States atom manages. Next, the Table atom uses a fetch method in the selected Record States atom using the transaction ID and identified record number. For multi-version records, the Record States atom loops through any record versions to find the correct version and the appropriate pointer to the corresponding Data atom. The Record States atom calls that Data atom with the data atom number that points to the record and permits its retrieval. When this process is completed, the database request engine provides the user with a recordset that lists all the records with the specified postal code.

In summary, it will be apparent to those of ordinary skill in the art that a database management system constructed in accordance with this invention provides an elastic, scalable demand-distributed data processing system. The system is fault tolerant and has a high degree of availability. It is platform independent and operates to provide an atomic, consistent, isolated and durable database. Moreover, it can operate over the internet without the need for high speed communications paths and is adapted for transactional processing that can be implemented over a wide geographic area.

In summary this invention achieves all these objectives by implementing one or more of the following features. This invention fragments the database into distributed objects that replicate on a peer-to-peer basis. Each transactional and archival node determines which atoms are to be memory resident on a local basis. Catalog atoms track locations to local and remote copies of various atoms and identify the catalogs of which they are members. Moreover each node can determine the best of multiple nodes from which to request a copy of the atom enabling geographically dispersed systems.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

The invention claimed is:

1. A database management system that enables users to interact with a database comprised of data and metadata, said system comprising
   A) a plurality of nodes, each node comprising:
      i) an interface between high level-input and output commands at a user level and input and output commands at the system level that control a sequence of operations for interacting with the data base, wherein, in response to certain system level commands, atom objects generate atoms, each atom containing a specified fragment of data or metadata whereby a set of all instances of atoms collectively define all the metadata and data in the database,
      ii) a communications control for establishing a communications path with each other node in the system, iii) a method responsive to a system command from the interface for requesting from a selected node copy of an atom that is relevant to the query but is not present in that node, iv) a method responsive to a request for an atom from another node for replicating the requested atom for transfer to the requesting node whereby only atoms required to complete a query need be located in any transaction node at any given time, and v) a method responsive to a change in an atom at that node for replicating that atom for transfer to every other node in the system in which that atom is resident, B) means connected to the plurality of nodes for providing communications paths between all the nodes, and C) means connected to said communications means for providing persistent storage for information in atom whereby the collection of atoms in persistent storage collectively contain all the data and metadata in the database.

2. A database management system as recited in claim 1 wherein certain of the atom objects produce catalog atoms that keep track of all atoms that are resident at that node and the location of each node that has a copy of each of the resident atoms.

3. A database management system as recited in claim 2 wherein one of the catalog atoms is a master catalog atom that is replicated in each node connected to the system, wherein another of the atoms is a single transaction manager atom for the database for tracking the progress of transactions initiated by the interface and wherein the master catalog identifies the location of the transaction manager atom.

4. A database management system as recited in claim 3 wherein the database at the user level comprises named tables with records and fields and operates in accordance with at least one named schema and others of the atom objects produce:

i) a table atom for each table that contains a list of fields, ii) a schema atom establishes a correspondence between a schema and the named tables relevant to that schema, and iii) a database atom that establishes a correspondence between the database and the named schema.

5. A database management system as recited in claim 4 wherein the database tables at the user level comprises identified records containing fields and data, wherein other atom objects produce data atoms that contain a predetermined number of data records and a record states atom that manages record versions and wherein said record states atom includes an array that identifies the managed data atoms assigned to that record states atom, an identification of each record version and, for each record version, information about that version and the location of the data atom containing that version.

6. A database management system as recited in claim 5 wherein each data atom additionally includes the address and length of each record within the data atom and the data records.

7. A database management system as recited in claim 4 wherein the database tables at the user level comprises identified blobs, wherein other atom objects produce blob atoms that contain a blob and a blob record states atom that includes a list of all associated blob atoms and the location of the blob in the blob atom.

8. A database management system as recited in claim 7 wherein each blob atom includes the address and length of each blob and the blob.

9. A database management system as recited in claim 1 wherein each node additionally comprises:

i) messaging means for generating and receiving predefined messages in response to system level commands, and ii) means for selecting one of the communications paths for transmitting the message.

10. A database management system as recited in claim 9 wherein each node comprises means for asynchronously testing the efficiency of each communications path.

11. A database management system as recited in claim 10 wherein said testing means includes means for generating a ping message and receiving a ping acknowledgement message for determining the ping time for each communications path.

12. A database management system as recited in claim 9 wherein said messaging means includes means for serializing an atom into a message and de-serializing a message into an atom and wherein each message is sent over the selected communications path asynchronously.

13. A database management system as recited in claim 12 wherein messages are sent under a protocol with controls that maintain message sequences.

14. A database management system as recited in claim 1 wherein individual nodes may be active and connected to the system and may be disconnected from the system and one of the atoms is a master catalog atom that identifies each active node in the system and that is replicated in each node connected to the system, the system comprising means for enabling a node to join the system including:

i) means for establishing a connection between the joining node and a selected one of the active nodes, ii) means in the joining node for asking the selected node for connection, iii) means in the selected node for updating its master catalog atom to indicate the joining node as an active node, iv) means in the selected node for transferring a message to the joining node including the selected node's identification and for broadcasting a message indicating the availability of the joining node to all other nodes in the system and persistent storage, v) means in said joining node for responding to the message by requesting a copy of the master catalog atom from the selected node, and vi) means in the selected node for transferring its updated master catalog atom to the joining node.

15. A database management system as recited in claim 14 wherein said joining node includes means responsive to the receipt of the updated master catalog atom for requesting copies of additional atoms in response to requests from the interface.

16. A database management system as recited in claim 14 wherein the selected node broadcasts the availability of the updated master catalog to all other nodes and to persistent storage and each other node and persistent storage includes means for acknowledging its receipt of the updated master catalog to the selected node.

17. A database management system as recited in claim 1 wherein an interface in one of the nodes makes a request that requires the production of a new atom wherein certain of the atom objects produce catalog atoms that keep track of atoms that are resident at that node, said one of said nodes additionally comprising:

i) means in said catalog atom that will track the new atom responsive to the interface request for causing the catalog atom to create that new atom with no content and to designate the new atom as a chairman for that atom, ii) means in the catalog atom that assigns an object identification to the new atom, iii) means in the catalog atom for establishing a status for the new atom that indicates there is no redundant copy of the new atom and that the new atom is not available to other nodes, iv) means in the catalog atom for broadcasting to all other corresponding catalog atoms in the system the existence of the new atom, v) means for populating the new atom and for making the new atom available on the system.

18. A database management system as recited in claim 17 wherein persistent storage includes means responsive to the storage of the new atom for sending a message to node with the new atom updating its status to indicate the existence of a redundant copy.

19. A database management system as recited in claim 1 wherein an interface in one of the nodes makes a request for an atom that only exists in other nodes and wherein certain of the atom objects produce catalog atoms that keep track of atoms that are resident at that node and other nodes, said system including:

i) means in the requesting catalog atom responsive to the interface request that will track the requested atom responsive to the interface request for creating that empty atom, ii) means in the requesting catalog atom for establishing selecting the most responsive node and requesting a copy of the atom from the most responsive node, iii) means in the selected node for sending a copy of the requested atom in an object message to the requesting node and for broadcasting the availability of the atom to other nodes in which the atom, iv) means for assessing the validity of the received object message, for populating the empty atom and for forwarding an object acknowledgment message to the selected node.

20. A database management system as recited in claim 19 wherein said selected node generates a relay list of all nodes containing the requested atom to which the selected node will forward messages from other related to that atom to the requesting node.

21. A database management system as recited in claim 20 wherein each of the other nodes that receive the broadcast object available message includes means for sending an object acknowledgment message to the selected node, said selected node including means for updating the relay list in response to the receipt of each object acknowledgment message from another node to terminate the relay of any subsequent messages to the requesting node.

22. A database management system as recited in claim 1 adapted for transactional processing for assuring consistency of the database wherein the system includes a first node involving an atom to be committed, at least one other node including a copy of that atom and a copy of that atom included in persistent storage, said system including:

i) means in the first node for generating a precommit message with a transaction identification for transfer to persistent storage, ii) means associated with persistent storage responsive to the precommit message for committing the transaction and thereafter broadcasting a commit message with the transaction identification to all the nodes, iii) means in the first and at least one other node responsive to the receipt of the commit message for updating the identified transaction.

23. A database management system that enables users to interact with a database comprised of data and metadata, said system comprising A) at least one transactional node that provides users with access to the database, and at least one archival node that maintains an archive of the entire database, each transactional node including a database request engine that provides an interface between high level-input and output query commands at a user level and input and output commands at the system level that control a sequence of operations for interacting with the database, wherein, in response to certain system level commands, atom objects generate atoms, each atom containing a specified fragment of data or metadata whereby a set of all instances of atoms collectively define all the metadata and data in the database, B) a database system network interconnecting all the nodes, C) a communications control in each of the nodes for establishing a communications path with each other node in the system, D) a method in each transactional node responsive to a system command from the database request engine for requesting a copy of an atom that is relevant to the query command but is not present in that node, E) a method in each node responsive to a request for an atom from another node for replicating the requested atom for transfer to the requesting node whereby only atoms required to complete a query command need be located in any transactional node at any given time, and F) a method in each transactional node responsive to a change in an atom at that node for replicating that change to every other node in the system that contains a copy of that atom.

24. A database management system as recited in claim 23 wherein certain of the atom objects produce catalog atoms that keep track of all atoms that are resident at that node and the location of each node that has a copy of each of the resident atoms.

25. A database management system as recited in claim 24 wherein one of the catalog atoms is a master catalog atom that is replicated in each node connected to the system, wherein another the atoms is a single transaction manager atom for the database for tracking the progress of transactions initiated by the interface and wherein the master catalog identifies the location of the transaction manager atom.

26. A database management system as recited in claim 25 wherein the database at the user level comprises named tables with records and fields and operates in accordance with at least one named schema and others of the atom objects produce:

i) a table atom for each table that contains a list of fields, ii) a schema atom establishes a correspondence between a schema and the named tables relevant to that schema, and iii) a database atom that establishes a correspondence between the database and the named schema.

27. A database management system as recited in claim 26 wherein the database tables at the user level comprises identified records containing fields and data, wherein other atom objects produce data atoms that contain a predetermined number of data records and a record states atom that manages record versions and wherein said record states atom includes an array that identifies the managed data atoms assigned to that record states atom, an identification of each record version and, for each record version, information about that version and the location of the data atom containing that version.

28. A database management system as recited in claim 27 wherein each data atom additionally includes the address and length of each record within the data atom and the data records.

29. A database management system as recited in claim 26 wherein the database tables at the user level comprises identified blobs, wherein other atom objects produce blob atoms that contain a blob and a blob record states atom that includes a list of all associated blob atoms and the location of the blob in the blob atom.

30. A database management system as recited in claim 29 wherein each blob atom includes the address and length of each blob and the blob.

31. A database management system as recited in claim 23 wherein each node additionally comprises:
  i) messaging means for generating and receiving predefined messages in response to system level commands, and
  ii) means for selecting one of the communications paths for transmitting the message.

32. A database management system as recited in claim 31 wherein each node comprises means for asynchronously testing the efficiency each communications path.

33. A database management system as recited in claim 32 wherein said testing means includes means for generating a ping message and receiving a ping acknowledgement message for determining the ping time for each communications path.

34. A database management system as recited in claim 31 wherein said messaging means includes means for serializing an atom into a message and de-serializing the message into an atom and wherein each message is sent over the selected communications path asynchronously.

35. A database management system as recited in claim 34 wherein messages are sent under a protocol with controls that maintain message sequences.

36. A database management system as recited in claim 23 wherein individual nodes may be active and connected to the system and may be disconnected from the system and one of the atoms is a master catalog atom that identifies each active node in the system and that is replicated in each node connected to the system, the system comprising means for enabling a node to join the system including:
  i) means for establishing a connection between the joining transactional node and a selected one of the active nodes,
  ii) means in the joining transactional node for asking the selected node for connection to the system,
  iii) means in the selected node for updating its master catalog atom to indicate the joining transactional node as an active node,
  iv) means in the selected node for transferring a message to the joining transactional node including the selected node's identification and for broadcasting a message indicating the availability of the joining transactional node to all other nodes in the system,
  v) means in said joining transactional node for responding to the message by requesting a copy of the master catalog atom from the selected node, and
  vi) means in the selected node for transferring its updated master catalog atom to the joining transactional node.

37. A database management system as recited in claim 36 wherein said joining transactional node includes means responsive to the receipt of the updated master catalog atom for requesting copies of additional atoms in response to system commands from its database request engine.

38. A database management system as recited in claim 36 wherein the selected node broadcasts the availability of the updated master catalog to all other nodes and each other node includes means for acknowledging its receipt of the updated master catalog to the selected node.

39. A database management system as recited in claim 23 wherein the database request engine in one of the transactional nodes makes a request that requires the production of a new atom and wherein certain of the atom objects produce catalog atoms that keep track of atoms that are resident at that node, said transactional node additionally comprising:
  i) means in said catalog atom for tracking the new atom responsive to the database request engine request, for causing the catalog atom to create that new atom with no content and for designating the new atom as a chairman for that atom,
  ii) means in the catalog atom for assigning an object identification to the new atom,
  iii) means in the catalog atom for establishing a status for the new atom that indicates there is no redundant copy of the new atom and that the new atom is not available to other nodes,
  iv) means in the catalog atom for broadcasting to all other corresponding catalog atoms in the system the existence of the new atom,
  v) means for populating the new atom and for making the new atom available to other nodes in the system.

40. A database management system as recited in claim 39 additionally including means in each archival node responsive to the storage of the new atom for sending a message to the new atom updating its status to indicate the existence of a redundant copy.

41. A database management system as recited in claim 23 wherein a database request engine in one transactional nodes requests for an atom that only exists in other nodes and wherein certain of the atom objects produce catalog atoms that keep track of atoms that are resident at that node and other nodes, said system including:
  i) means responsive to the request in the requesting catalog atom that will track the requested atom for creating that empty atom,
  ii) means in the requesting catalog atom for establishing selecting the most responsive node and requesting a copy of the atom from the most responsive node,
  iii) means in the selected node for sending a copy of the requested atom in an object message to the requesting node and for broadcasting the availability of the atom to other nodes in which the atom resides,
  iv) means for assessing the validity of the received object message, for populating the empty atom and for forwarding an object acknowledgment message to the selected node.

42. A database management system as recited in claim 41 wherein said selected node generates a relay list of all nodes containing the requested atom to which the selected node will forward messages from other related to that atom to the requesting node.

43. A database management system as recited in claim 42 wherein each of the other nodes that receive the broadcast object available message includes means for sending an object acknowledgment message to the selected node, said selected node including means for updating the relay list in response to the receipt of each object acknowledgment message from another node to terminate the relay of any subsequent messages to the requesting node.

44. A database management system as recited in claim 23 adapted for assuring consistency of the database during transactional processing wherein the system includes a first node involving a transaction to be committed and at least one other node including an archival node includes a copy of that atom including, said system including:
  i) means in the first node for generating a precommit message with a transaction identification for transfer to an archival node,
  ii) means associated with archival node responsive to the precommit message for committing the transaction and thereafter broadcasting a commit message with the transaction identification to all the nodes, and
  iii) means in the first and at least one other node responsive to the receipt of the commit message for updating the identified transaction.

* * * * *